United States Patent

Asada

[11] Patent Number: 5,090,952
[45] Date of Patent: Feb. 25, 1992

[54] AUTOMATIC TRANSMISSION

[75] Inventor: Toshiyuki Asada, Susono, Japan

[73] Assignee: Toyota Jidosha Kabushiki Kaisha, Toyota, Japan

[21] Appl. No.: 474,464

[22] Filed: Feb. 2, 1990

[30] Foreign Application Priority Data

Feb. 3, 1989 [JP] Japan .................................. 1-25322
Jul. 19, 1989 [JP] Japan ................................. 1-186992

[51] Int. Cl.⁵ ............................................. F16H 57/10
[52] U.S. Cl. ................................... 475/278; 475/285; 475/289; 475/284
[58] Field of Search .................. 475/10, 252, 275, 277, 475/278, 284, 285, 288, 289, 292, 312, 313, 324, 325, 330, 280

[56] References Cited

U.S. PATENT DOCUMENTS

| | | |
|---|---|---|
| 3,811,343 | 5/1974 | Mori et al. . |
| 3,863,524 | 2/1975 | Mori et al. . |
| 3,877,320 | 4/1975 | Iijima . |
| 3,899,940 | 8/1975 | Iijima . |
| 3,946,624 | 3/1976 | Murakami et al. ............. 475/284 X |
| 3,952,613 | 4/1976 | Iijima . |
| 4,007,648 | 2/1977 | Bookout . |
| 4,027,552 | 6/1977 | Murakami et al. .................. 475/280 |
| 4,638,688 | 1/1987 | Hiraiwa . |
| 4,649,763 | 3/1987 | Graef et al. . |
| 4,653,348 | 3/1987 | Hiraiwa . |
| 4,660,439 | 4/1987 | Hiraiwa . |
| 4,774,856 | 10/1988 | Hiraiwa . |

FOREIGN PATENT DOCUMENTS

| | | |
|---|---|---|
| 0121259 | 10/1984 | European Pat. Off. . |
| 0164553 | 12/1985 | European Pat. Off. . |
| 2406124 | 10/1974 | Fed. Rep. of Germany . |
| 2429267 | 1/1975 | Fed. Rep. of Germany . |
| 2612020 | 11/1976 | Fed. Rep. of Germany . |
| 3511180 | 10/1985 | Fed. Rep. of Germany . |
| 51-17767 | 2/1976 | Japan . |
| 51-48062 | 4/1976 | Japan . |
| 51-108168 | 9/1976 | Japan . |
| 51-108170 | 9/1976 | Japan . |
| 51-127968 | 11/1976 | Japan . |
| 52-76570 | 6/1977 | Japan . |
| 52-77973 | 6/1977 | Japan . |
| 53-120045 | 10/1978 | Japan . |
| 53-123762 | 10/1978 | Japan .................................. 475/284 |
| 53-123763 | 10/1978 | Japan .................................. 475/284 |
| 54-132058 | 10/1979 | Japan . |
| 59-26645 | 2/1984 | Japan . |
| 60-84445 | 5/1985 | Japan .................................. 475/285 |
| 60-88252 | 5/1985 | Japan . |
| 2-26350 | 1/1990 | Japan . |
| 2-72245 | 3/1990 | Japan . |
| 2062145 | 5/1981 | United Kingdom ................ 475/277 |
| 2076912 | 12/1981 | United Kingdom ................ 475/277 |

*Primary Examiner*—Leslie A. Braun
*Assistant Examiner*—Benjamin Levi
*Attorney, Agent, or Firm*—Cushman, Darby & Cushman

[57] ABSTRACT

A gear train for changing the rotational speed of an input shaft to transmit the resultant rotation to an output shaft consists of single pinion type first and third planetary gear sets and a double pinion type second planetary gear set. Ring gears of these three planetary gear sets are normally or selectively interconnected to each other, a carrier of the first planetary gear set is normally or selectively connected to a sun gear of the third planetary gear set, a sun gear of the first planetary gear set is normally or selectively connected to a sun gear of the second planetary gear set, and the sun gear of the second planetary gear set is normally or selectively connected to the carrier of the first planetary gear set, whereby at least five forward speeds and one reverse are permitted to be set.

38 Claims, 9 Drawing Sheets

AUTOMATIC TRANSMISSION

BACKGROUND OF THE INVENTION

1. Field of the Invention

This invention relates to an automatic transmission for use in a vehicle and, more particularly, to an automatic transmission having a gear train having two single pinion type planetary gear sets and one double pinion type planetary gear set.

2. Description of the Prior Art

As is well known, a planetary gear set has three components, i.e., a sun gear, a ring gear and a carrier for holding a pinion gear meshing with the sun gear and the ring gear, wherein one component is defined as the input member, another component is defined as the output member and the other remaining component is held stationary, so that the input rotational speed is either increased or reduced forward or reversely to generate the output. Thus, in general, a plurality of planetary gear sets are combined to constitute a gear train for automatic transmission up to now. In this case, the obtained change gear ratio is changed variously according to how to combine the planetary gear sets, a value of the gear ratio (ratio of the number of teeth of sun gear to that of ring gear) of the planetary gear set and further which of the single pinion type planetary gear set and double pinion type planetary gear set is used, while all of the combinations cannot be necessarily put into practical use. Therefore, the gear trains that are possible in practical use are limited according to various requirements of the mounting property on a vehicle, the possibility of manufacture, the gear change characteristics, the required power performance or the like. In other words, since a great number of gear trains are constituted according to various combinations of planetary gear sets and ways of setting the gear ratios, it is very difficult to create the gear train satisfying the various requirements of the automatic transmission for use in a vehicle.

Conventionally, a number of automatic transmissions devised under such background have been proposed, and three of these automatic transmissions, each of which uses three planetary gear sets, are disclosed in Japanese Patent Laid-open Nos. 60-88252, 51-48062 and 54-132058, for example.

The automatic transmission disclosed in the above-mentioned Japanese Patent Laid-open No. 60-88252 is so constituted that three single pinion type planetary gear sets are combined to constitute a gear train, whereby five forward speeds and one reverse are permitted to set. However, in this automatic transmission, if the gear ratios of the respective planetary gear sets are so set that the change gear ratios of the respective gear change stages are approximately relevant to geometric series to prevent a drive force of a vehicle from remarkable reduction before and after the gear change, the gear ratio of any planetary gear set needs to be set to a remarkably large value, resulting disadvantageously in the enlargement of an outer diameter of the pertinent planetary gear set. On the contrary, if the gear ratios of the respective planetary gear sets are set to such an extent that the respective planetary gear sets do not particularly increase in outer diameter, the change gear ratios of the respective gear change stages are not generally relevant to geometric series to thereby bring about the deterioration of the power performance of the vehicle.

Also, the automatic transmission described in the above-mentioned Japanese Patent Laid-open No. 51-48062 is so constituted that two single pinion type planetary gear sets and one double pinion type planetary gear set are combined to constitute a gear train, whereby five forward speeds and two reverses are permitted to set. In this automatic transmission, however, when the gear change is made between the first gear and the second gear and between the second gear and the third gear, it is necessary to change the engaged and released conditions of four engaging means consisting of two clutch means and two brake means, so that shocks are worsened or complicated gear change control is inevitably done.

Further, the automatic transmission described in the above-mentioned Japanese Patent Laid-open No. 54-132058 is so constituted that one Ravignawx type planetary gear set and one single pinion type planetary gear set or two single pinion type planetary gear sets and one double pinion type planetary gear set are combined to constitute a gear train, whereby five forward speeds and one reverse are permitted to set. In this automatic transmission, however, a large load torque is exerted to sun gears of the respective planetary gear sets in the first and second gears and also in the reverse to be unfavorable to the strength and the durability. Also, since the power circulation takes place in the third gear, this automatic transmission is not only disadvantageous to the strength and the durability in that respect, but also it degrades the transmitting efficiency of power.

SUMMARY OF THE INVENTION

An object of the present invention is to provide an automatic transmission provided with a gear train consisting of two single pinion type planetary gear sets and one double pinion type planetary gear set and capable of setting at least five forward speeds and one reverse.

Another object of the present invention is to provide an automatic transmission capable of facilitating the control of gear change.

A further object of the present invention is to provide a compact automatic transmission.

To achieve the above objects, an automatic transmission according to the present invention comprises a gear train consisting of a single pinion type first planetary gear set, a double pinion type second planetary gear set and a single pinion type third planetary gear set, wherein in the gear train, ring gears of the respective planetary gear sets are normally or selectively connected to each other, a carrier of the first planetary gear set is normally or selectively connected to a sun gear of the third planetary gear set, and a sun gear of the first planetary gear set is normally or selectively connected to a sun gear of the second planetary gear set. The rotation of an input shaft is increased or reduced through the gear train to be transmitted to an output shaft.

Also, the automatic transmission according to the present invention comprises clutch means for selectively connecting the input shaft to a carrier of the second planetary gear set, another clutch means for selectively connecting the input shaft to the sun gear of the second planetary gear set, further clutch means for selectively connecting the carrier of the first planetary gear set to the sun gear of the second planetary gear set, still further clutch means for selectively connecting the sun gear of the first planetary gear set to the sun gear of the second planetary gear set, brake means for stopping the rotation of the sun gear of the third planetary gear set, and brake means for stopping the rotation of the sun gear of the first planetary gear set.

Further, in the automatic transmission according to the present invention, the input shaft is normally connected to the carrier of the second planetary gear set.

These clutch means and brake means are properly engaged or released to set at least five forward speeds and one reverse. A plurality of kinds of combination patterns of the clutch means and brake means to be engaged are provided to set any gear change stage. Further, the automatic transmission according to the present invention is permitted to accomplish the gear change from any one gear to another gear by changing over either two of the clutch means and brake means. Thus, the clutch means or brake means associated with the gear change has such the constitution including a one-way clutch to thereby perform the gear change which has few shocks and is easy to control.

The above and further objects and features of the present invention will be more apparent from the following detailed description when the same is read in connection with the accompanying drawings. It must be understood, however, that the drawings are for the purpose of illustration only and are not intended as a definition of limits of this invention.

DETAILED DESCRIPTION OF THE PREFERRED EMBODIMENTS

Figure 1:
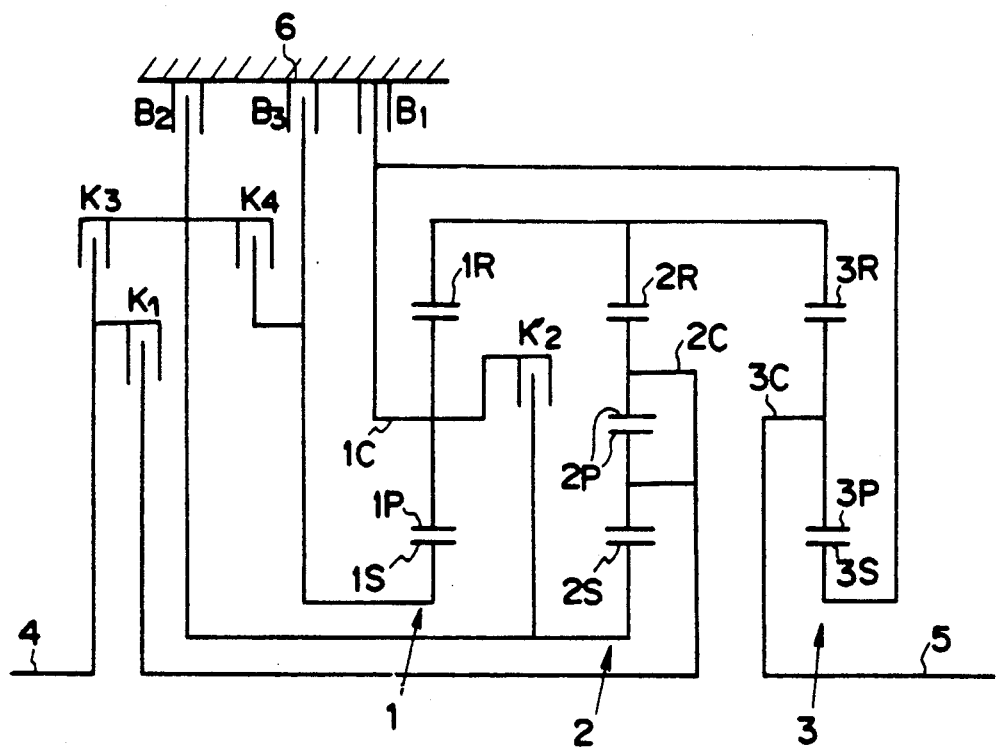
FIGS. 1 through 18 are skelton diagrams respectively showing embodiments according to the present invention in principle.

Referring to FIG. 1, among three planetary gear sets constituting a gear train, each of a first planetary gear set 1 and a third planetary gear set 3 is a single pinion type planetary gear set, and a second planetary gear set 2 is a double pinion type planetary gear set. That is, the first planetary gear set 1 consists of a sun gear 1S, a ring gear 1R disposed to be concentrical with the sun gear 1S and a carrier 1C for holding a pinion gear 1P meshing with these gears 1S, 1R as main elements, whereas the second planetary gear set 2 consists of a sun gear 2S, a ring gear 2R and a carrier 2C for holding at least a pair of pinion gears 2P disposed between these gears 2S, 2R to mesh with each other as main components. Also, the third planetary gear set 3, similarly to the first planetary gear set 1, consists of a sun gear 3S, a ring gear 3R disposed to be concentrical with the sun gear 3S and a carrier 3C for holding a pinion gear 3P meshing with these gears 3S, 3R as main components. Further, the staring gear 1R of the first planetary gear set 1, the ring gear 2R of the second planetary gear set 2 and the ring gear 3R of the third planetary gear set 3 are connected to each other so as to rotate as a single unit, while the carrier 1C of the first planetary gear set 1 and the sun gear 3S of the third planetary gear set 3 are connected to each other so as to rotate as a single unit. On the other hand, fourth clutch means K4 is provided between the sun gear 1S of the first planetary gear set 1 and the sun gear 2S of the second planetary gear set 2 to selectively interconnect these sun gears 1S, 2S. Further, second clutch means K2 is disposed between the carrier 1C of the first planetary gear set 1 and the sun gear 2S of the second planetary set 2 to selectively interconnect the carrier 1C and the sun gear 2S.

Further, for the connecting structure of the respective members as noted above, use is made of a quill shaft, a solid shaft, a proper connecting drum or like connecting structure employed in a general automatic transmission.

An input shaft 4 is connected to an engine (not shown) through power transmitting means (not shown) such as a torque converter and a fluid coupling. First clutch means K1 is provided between the input shaft 4 and the carrier 2C of the second planetary gear set 2 to interconnect selectively the input shaft 4 and the carrier 2C, and third clutch means K3 is provided between the input shaft 4 and the sun gear 2S of the second planetary gear set 2 to interconnect selectively the input shaft 4 and the sun gear 2S.

The respective clutch means K1, K2, K3 and K4 generally function to selectively interconnect the respective members or release the interconnection thereof, and are permitted to employ a wet type multi-disc clutch engaged or released by a hydraulic servo system or like system employed generally in the automatic transmission, a one-way clutch or a structure in which the wet type multi-disc clutch and one-way clutch are disposed in series or parallel relationship, if necessary. Further, since the respective constituent members in the practical use are restricted from the view point of the arrangement, it is a matter of course that a proper intermediate member such as a connecting drum is interposed as a connecting member for each of the clutch means K1, K2, K3 and K4.

Further, first brake means B1 for selectively blocking the rotation of the carrier 1C of the first planetary gear set 1 and the sun gear 3S of the third planetary gear set 3, which are connected to each other, is provided between these carrier 1C and sun gear 3S and a transmission casing (hereinafter will be simply referred to as casing) 6. Also, second brake means B2 for selectively blocking the rotation of the sun gear 2S of the second planetary gear set 2 is provided between the sun gear 2S and the casing 6. Further, third brake means B3 for selectively blocking the rotation of the sun gear 1S of the first planetary gear set 1 is disposed between the sun gear 1S and the casing 6. For each of these brake means B1, B2 and B3, use is made of a band brake or a wet type multi-disc brake driven by a hydraulic servo system or the like generally employed in the automatic transmission, or a one-way clutch, or a combination of these brakes and clutch. Also, in the practical use, it is a matter of course that proper connecting members are respectively interposed between these brake means B1, B2 and B3 and the respective members to be held stationary by these brake means B1, B2 and B3 or between these brake means B1, B2 and B3 and the casing 6.

An output shaft 5 for transmitting the rotation to a propeller shaft or a counter gear (not shown respectively) is connected to the carrier 3C of the third planetary gear set 3.

The automatic transmission thus constituted as noted above makes the gear change of five forward speeds and one reverse or seven forward speeds and one reverse possible, and the respective gears are achieved by engaging the clutch means K1, K2, K3 and K4 and the brake means B1, B2 and B3 as shown on Table 1.

TABLE 1

| | clutch means | | | | brake means | | | gear ratio | |
|---|---|---|---|---|---|---|---|---|---|
| | K1 | K2 | K3 | K4 | B1 | B2 | B3 | ($\rho_1 = 0.510, \rho_2 = 0.313, \rho_3 = 0.398$) | |
| 1st | ◯ | X | X | ◯ | ◯ | X | X | $(1 + \rho_3)\left\{1 + \dfrac{\rho_2(1 + \rho_1)}{\rho_1(1 - \rho_2)}\right\}$ | 3.284 |
| 2nd | ◯ | X* | X | X | ◯* | ◯* | X | $(1 + \rho_3)/(1 - \rho_2)$ | 2.035 |
| 3rd | ◯ | X | ◯ | X | ◯ | X | X | $1 + \rho_3$ | 1.398 |
| 4th | ◯*1 | ◯*1 | ◯*1 | X*1 | X | X | X | 1 | 1.000 |
| 5th | X | ◯ | ◯ | X | X | X | ◯ | $(1 + \rho_1 + \rho_3)/(1 + \rho_3)$ | 0.733 |
| Rev | X | X | ◯ | ◯ | ◯ | X | X | $-(1 + \rho_3)/\rho_1$ | −2.741 |
| 2.5th | ◯ | X | X | ◯*2 | X | ◯*2 | X*2 | $\dfrac{(1 + \rho_1)(1 + \rho_3)}{(1 - \rho_2)(1 + \rho_1 + \rho_3)}$ | 1.610 |
| 3.5th | ◯ | X | ◯ | X | X | X | ◯ | $\dfrac{(1 + \rho_1)(1 + \rho_3)}{1 + \rho_1 + \rho_3}$ | 1.106 |

*At least either two may be engaged.
*1At least three clutch means may be engaged.
*2At least either two or more out of three may be engaged.

Further, on Table 1, the change gear ratios of the respective speeds are shown together with specified values thereof. Each of the specified values is a value obtained when the gear ratios $\rho_1$, $\rho_2$ and $\rho_3$ of the respective planetary gear sets 1, 2 and 3 are defined as 0.510, 0.313 and 0.398, respectively. Further, on Table 1, the mark ◯ represents the engaged condition and the mark x represents the released condition. Hereinafter will be first described the case of setting five forward speeds and one reverse and then two speeds which can be added thereto.

First Gear

The first and fourth clutch means K1, K4 and the first brake means B1 are engaged. That is, the carrier 2C of the second planetary gear set 2 is connected to the input shaft 4, while the sun gear 1S of the first planetary gear set 1 is connected to the sun gear 2S of the second planetary gear set 2 through the fourth clutch means K4. Further, the carrier 1C of the first planetary gear set 1 and the sun gear 3S of the third planetary gear set 3 connected to the carrier 1S are held stationary. Accordingly, in the second planetary gear set 2, the carrier 2C rotates together with the input shaft 4, so that the ring gear 2R is rotated forward (in the same direction as the input shaft 4, and the same shall apply hereinafter), and the sun gear 2S is rotated in reverse direction (in the opposite direction to the input shaft 4, and the same shall apply hereinafter). As a result, in the first planetary gear set 1, the ring gear 1R is connected to the ring gear 2R of the second planetary gear set 2 and the carrier 1C is held stationary, so that the sun gear 1S is rotated in the reverse direction. Also, in the third planetary gear set 3, the ring gear 3R is connected to the ring gear 2R of the second planetary gear set 2 to be rotated forward, and the sun gear 3S is held stationary, so that the carrier 3C is rotated forward. As a result, the output shaft 5 connected to the carrier 3C of the third planetary gear set 3 is rotated forward together with the carrier 3C and slower than the input shaft 4 to provide the first gear having the largest change gear ratio in the forward speeds. As shown on Table 1, this change gear ratio is represented as follows:

$$(1 + \rho_3)\left\{1 + \dfrac{\rho_2(1 + \rho_1)}{\rho_1(1 + \rho_2)}\right\}$$

and the specified value thereof comes to 3.284. In this case, the power circulation does not take place.

Second Gear

The first clutch means K1 is engaged, while at least either two (for example, the first and second brake means B1, B2) out of the second clutch means K2 and the first and second brake means B1, B2 are engaged. That is, when the first clutch means K1 and the first and second brake means B1, B2 are engaged, the second brake means B2 is engaged instead of the fourth clutch means K4 under the first gear condition. Thus, in the second planetary gear set 2, since the carrier 2C is rotated together with the input shaft 4 under the condition that the sun gear 2S is held stationary, the ring gear 2R is rotated forward slower than the input shaft 4. This forward rotation is transmitted to the ring gear 1R of the first planetary gear set 1 and the ring gear 3R of the third planetary gear set 3. In the third planetary gear set 3, since the ring gear 3R slowly rotates forward under the condition that the sun gear 3S is held stationary, the carrier 3C is rotated forward slower than the ring gear 3R. As a result, the output shaft 5 connected to the carrier 3C of the third planetary gear set 3 is rotated forward slower than the input shaft 4 to provide the second gear. Further, in this case, since the sun gear 1S is in a condition to disconnect from the sun gear 2S of the second planetary gear set 2 and the casing 6, the first planetary gear set 1 does not particularly perform the speed increase and reduction operations. Thus, as shown on Table 1, the change gear ratio in this case is represented as follows;

$(1+\rho_3)/(1-\rho_2)$ and the specified value thereof comes to 2.035. The power circulation does not take place also in this case.

Third Gear

The first and third clutch means K1, K3 and the first brake means B1 are engaged. That is, the first clutch means K1 and the first and second brake means B1, B2 are engaged to set the second gear, and then the third clutch means K3 is engaged instead of the second brake means B2 under such condition. Accordingly, both the sun gear 2S and the carrier 2C of the second planetary gear set 2 are connected to the input shaft 4, while the carrier 1C of the first planetary gear set 1 and the sun gear 3S of the third planetary gear set 3 are held stationary. As a result, two components i.e., the carrier 2C and the sun gear 2S rotate together with the input shaft 4, so that the whole second planetary gear set 2 is rotated as a single unit at the same speed as the input shaft 4, and the rotation of the ring gear 2R is transmitted to the ring gears 1R, 3R of the first and third planetary gear sets 1, 3. In the third planetary gear set 3, since the sun gear 3S is held stationary, the ring gear 3R rotates at the same speed as the input shaft 4, so that the carrier 3C is rotated forward slower than the ring gear 3R. On the contrary, the first planetary gear set 1 is not particularly associated with the speed increase and reduction operations, since the sun gear 1S is in a condition to disconnect from the sun gear 2S of the second planetary gear set 2 and the casing 6. Thus, in this case, only the third planetary gear set 3 substantially performs the retarding operation, whereby the rotation of the input shaft 4 is transmitted to the output shaft 5. As shown on Table 1, the change gear ratio is represented as follows:

$$(1+\rho_3)$$

and the specified value thereof comes to 1.398. Also, the power circulation does not take place in this case.

Fourth Gear

At least either three out of the first to fourth clutch means K1, K2, K3 and K4 are engaged, and the brake means B1, B2 and B3 are released. That is, the first and third clutch means K1, K3 and the first brake means B1 are engaged under the third gear condition, for example, and then the second clutch means K2 or fourth clutch means K4 is engaged instead of the first brake means B1 under such condition. By so doing, the first to third clutch means K1 to K3 are engaged or the first, third and fourth clutch means K1, K3 and K4 are engaged. If at least three clutch means are thus engaged, the whole gear train rotates as a single unit together with the input shaft 4 and the speed increase and reduction operations are not produced, so that the change gear ratio comes to "1". For example, the first to third clutch means K1, K2 and K3 are engaged to cause a drive force from the input shaft 4 to transmit to the output shaft 5 without taking place the power circulation.

Fifth Gear

The second and third clutch means K2, K3 and the third brake means B3 are engaged. That is, under the fourth gear condition, the first to third clutch means K1 to K3 are engaged Then, under such the engaged condition, the third brake means B3 is engaged instead of the first clutch means K1. Thus, in the first planetary gear set 1, the carrier 1C is connected through the second clutch means K2 to the sun gear 2S of the second planetary gear set 2 connected to the input shaft 4, and the sun gear 1S is held stationary, so that the ring gear 1R is rotated forward faster than the input shaft 4, and this rotation of the ring gear 1R is transmitted to the ring gears 2R, 3R of the second and third planetary gear sets 2, 3. Further, in the third planetary gear set 3, the sun gear 3S rotates forward together with the carrier 1C of the first planetary gear set 1 and at the same speed as the input shaft 4, and the ring gear 3R rotates forward faster than the input shaft 4, so that the carrier 3C is rotated forward at an intermediate speed between that of the sun gear 3S and that of the ring gear 3R. Since the carrier 2C of the second planetary gear set 2 is in a condition to disconnect from the input shaft 4, the second planetary gear set 2 is not particularly associated with the speed increase and reduction operations, while the sun gear 2S acts as a transmitting member for connecting the carrier 1C of the first planetary gear set 1 to the input shaft 4, as noted above. That is, in this case, the carrier 1C of the first planetary gear set 1 and the sun gear 3S of the third planetary gear set 3 are indirectly connected to the input shaft 4, while these planetary gear sets 1, 3 perform the speed increase and reduction operations, so that the rotation of the input shaft 4 is increased to be transmitted to the output shaft 5 to provide the fifth gear serving as the over drive. Further, as the carrier 1C of the first planetary gear set 1 and the sun gear 3S of the third planetary gear set 3 are connected to the input shaft 4 through the sun gear 2S of the second planetary gear set 2 without directly connecting to the input shaft 4, the rotational speed of the sun gear 2S and the relative rotational speed of the pinion gear to the carrier 2C in the second planetary gear set 2 are reduced to be advantageous to the durability. As shown on Table 1, the change gear ratio in this case is represented as follows:

$$(1+\rho_1+\rho_3)/(1+\rho_3)$$

and the specified value thereof comes to 0.733. Also, the power circulation does not take place in this case.

Reverse Gear

The third and fourth clutch means K3, K4 and the first brake means B1 are engaged That is, the sun gear 1S of the first planetary gear set 1 and the carrier 2C of the second planetary gear set 2 are connected to the input shaft 4, while the carrier 1C of the first planetary gear set 1 and the sun gear 3S of the third planetary gear set 3 are held stationary. In this case, since the carrier 2C of the second planetary gear set 2 is in a condition to disconnect from the input shaft 4, the second planetary gear set 2 is not particularly associated with the speed increase and reduction operations similar to the case of the fifth gear as noted above. Further, in the first planetary gear set 1, the sun gear 1S rotates together with the input shaft 4 under the condition that the carrier 1C is held stationary, so that the ring gear 1R is rotated in the reverse direction slower than the input shaft 4, and the rotation of the ring gear 1R is transmitted to the ring gear 3R of the third planetary gear set 3. Accordingly, in the third planetary gear set 3, the ring gear 3R rotates in the reverse direction under the condition that the sun gear 3S is held stationary, so that the carrier 3C is rotated in the reverse direction at a still slower speed. As a result, the rotation of the input shaft 4 is retarded and reversed by the first and third planetary gear sets 1, 3 to be transmitted to the output shaft 4 to thereby provide the reverse. As shown on Table 1, the change gear ratio in this case is represented as follows:

$$-(1+\rho_3)/\rho_1$$

and the specified value thereof comes to −2.741. Further, the power circulation does not take place even in this case.

As is apparent from the description on each of first to fifth forward speeds and reverse, the automatic transmission shown in FIG. 1 is permitted to set the change gear ratios in the forward speeds to be approximately relevant to the geometric series when five forward speeds and one reverse are set, so that a drive force before and after the gear change is free from the remarkable reduction and the power performance of a vehicle is improved. Further, since the gear ratios of the respective planetary gear sets 1, 2, 3 are set to the proper values within the range of about 0.31 to 0.51, the diameter of the planetary gear set is not enlarged to provide a compact speed change gear. As is apparent from the description on the respective speeds, it suffices for the gear change to the other adjacent gear to release either one engaging means and engage the other engaging means, i.e., the gear change in the forward speed is performed by changing over two engaging means, so that the control for the gear change is facilitated, while it is advantageous to the reduction of shocks. Further, since the power circulation does not take place, the efficiency of transmitting the drive force is improved, and a compact automatic transmission excellent in durability is obtained by the reasons why the relative rotational speed of the pinion gears is reduced, the load torque of each of the gears and engaging means are small and the rotational speed of each gear is reduced. And, the change gear ratio on the overdrive is set to about 0.733 to improve the power performance, the fuel consumption and the silence property in high speed travelling, and the change gear ratio on the reverse is set to about −2.741 to ensure a sufficient drive force. Further, since the input and output shafts 4, 5 are disposed on the same axis, an automatic transmission suitably used in FR car (front engine rear drive car) is provided.

Also, in the embodiment shown in FIG. 1, it is possible to set other two gears, in addition to the above-mentioned gears. Each value of the change gear ratios of these two gears is defined as a value between the second gear and the third gear and a value between the third gear and the fourth gear. These values are represented as the 2.5th gear and the 3.5th gear as shown on the lower stage of Table 1.

2.5th Gear

This gear corresponds to the gear between the second gear and the third gear, and the first and fourth clutch means K1 and K4 and the second brake means B2 are engaged. That is, the carrier 2C of the second planetary gear set 2 is connected to the input shaft 4, while the sun gear 1S of the first planetary gear set 1 and the sun gear 2S of the second planetary gear set 2 are held stationary. Accordingly, in the second planetary gear set 2, the carrier 2C rotates forward together with the input shaft 4 under the condition that the sun gear 2S is held stationary, so that the ring gear 2R is rotated forward slower than the input shaft 4, and the rotation of the ring gear 2R is transmitted to the ring gears 1R, 3R of the first and third planetary gear sets 1, 3. Further, in the first planetary gear set 1, since the sun gear 1S is held stationary, the ring gear 1R rotates forward slower than the input shaft 4, so that the carrier 1C is rotated forward at a still slower speed, and the rotation of the carrier 1C is transmitted to the sun gear 3S of the third planetary gear set 3. As a result, in the third planetary gear set 3, the ring gear 3R rotates forward slower than the input shaft 4, an the sun gear 3S rotates forward still slower than the ring gear 3R, so that the carrier 3C and the output shaft 5 connected to the carrier 3C are rotated forward remarkably slower than the input shaft 4. That is, the respective planetary gear sets 1, 2 and 3 perform the retarding operation, whereby the rotation of the input shaft 4 is retarded to be transmitted to the output shaft 5. As shown on Table 1, the value of the change gear ratio is represented as follows:

$$\frac{(1 + \rho_1)(1 + \rho_3)}{(1 + \rho_2)(1 + \rho_1 + \rho_3)}$$

and the specified value thereof comes to 1.610. In this case, the power circulation does not take place.

3.5th Gear

This gear corresponds to the gear between the third gear and the fourth gear, and the first and third clutch means K1, K3 and the third brake means B3 are engaged. That is, the carrier 2C and the sun gear 2S of the second planetary gear set 2 are connected to the input shaft 4, and the sun gear 1S of the first planetary gear set 1 is held stationary. Thus, since two components of the second planetary gear set 2 rotate together with the input shaft 4, the whole second planetary gear set 2 is rotated forward as a single unit at the same speed as the input shaft 4, and accordingly the ring gears 1R, 3R of the first and third planetary gear sets 1, 3 are rotated forward at the same speed as the input shaft 4. Further, in the first planetary gear set 1, since the ring gear 1R rotates forward at the same speed as the input shaft 4 under the condition that the sun gear 1S is held stationary, the carrier 1C is rotated forward slower than the input shaft 4, and the rotation of the carrier 1C is transmitted to the sun gear 3S of the third planetary gear set 3. As a result, in the third planetary gear set 3, the sun gear 3S rotates forward slower than the input shaft 4 under the condition that the ring gear 3R rotates forward at the same speed as the input shaft 4, so that the carrier 3C and the output shaft 5 connected to the carrier 3C are rotated forward at a speed retarded relative to the input shaft 4 by the first and third planetary gear sets 1, 3. Hence, as shown on Table 1, the change gear ratio is represented as follows:

$$(1+\rho_1)(1+\rho_3)/(1+\rho_1+\rho_3)$$

and the specified value thereof comes to 1.106. In this case, the power circulation also does not take place.

Figure 2:
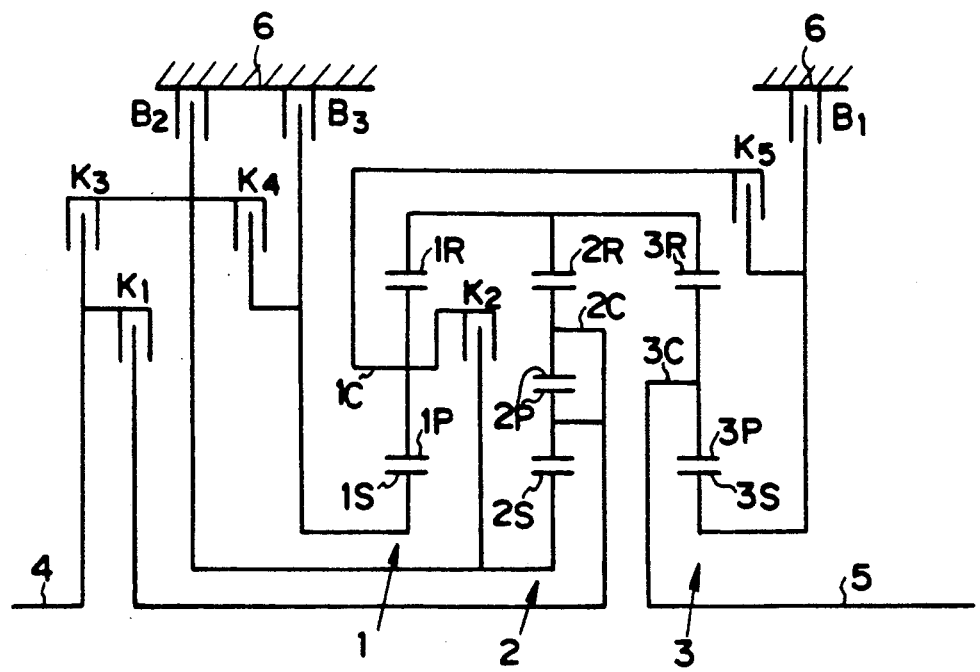

Now, in the embodiment shown in FIG. 1, the carrier 1C of the first planetary gear set 1 is normally connected to the sun gear 3S of the third planetary gear set 3, while the carrier 1C and the sun gear 3S may be selectively connected to each other in accordance with the embodiment of the present invention, as shown in FIG. 2. The automatic transmission shown in FIG. 2 is similar to that in FIG. 1, except that the first brake means B1 is disposed between the sun gear 3S of the third planetary gear set 3 and the casing 6, while the fifth clutch means K5 is disposed between the carrier 1C of the first planetary gear set 1 and the sun gear 3S of the third planetary gear set 3 to selectively interconnect the carrier 1C and the sun gear 3S. Even in the embodiment shown in FIG. 2, it is possible to set respective speeds without taking place the power circulation, and Table 2 shows the operation of this embodiment.

TABLE 2

|  | clutch means | | | | | brake means | | |
| --- | --- | --- | --- | --- | --- | --- | --- | --- |
|  | K1 | K2 | K3 | K4 | K5 | B1 | B2 | B3 |
| 1st | O | X | X | O | O | O | X | X |
| 2nd | O | X* | X | O* | X* | O* | O* | X* |
| 3rd | O | X* | O* | O* | X* | O | X | X* |
| 4th | O* | O* | O* | O* | O* | X | X | X |
| 5th | X | O | O | X | O | X | X | O |
| Rev | X | X | O | O | O | O | X | X |
| 2.5th | O | X | X | O* | O | X | O* | O* |
| 3.5th | O | X | O | X | O | X | X | O |

*These engaged and released conditions do not necessarily need to be as shown on Table 2, but the pertinent gear is permitted to set according to the combination of a plurality of other engaged and released conditions, which are shown on Table 9.

Further, in the following embodiments, it is possible to set the five to seven forward speeds and one reverse. On Table 2 and the subsequent tables showing the operation of the automatic transmission, the 2.5th gear and 3.5th gear are represented as the gear to be added to the five forward speeds and one reverse set as the basic gears. When the automatic transmission is so constituted to set the seven forward speeds and one reverse, the 2.5th gear corresponds to the third gear and the 3.5th gear corresponds to the fifth gear.

Figure 3:
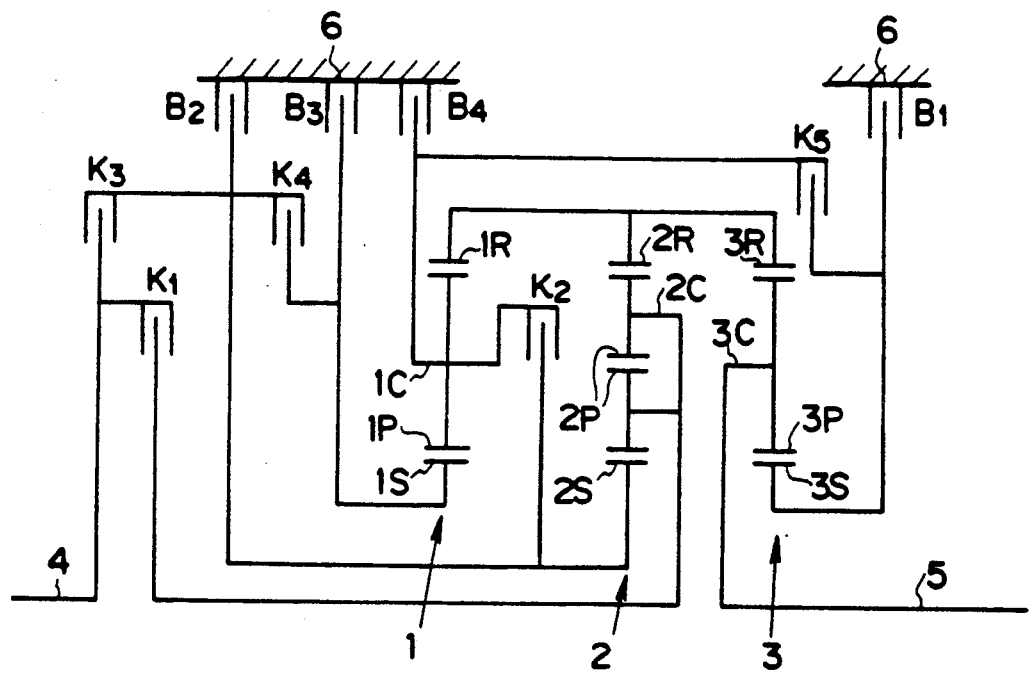

Further, as the fifth clutch means K5 is additionally provided, it is possible to provide with further brake means, and this embodiment is shown in FIG. 3. This embodiment is similar to that shown in FIG. 2, except that fourth brake means B4 is additionally provided between the carrier 1C of the first planetary gear set 1 and the casing 6. Table 3 shows the operation of this embodiment.

TABLE 3

|  | clutch means | | | | | brake means | | | |
| --- | --- | --- | --- | --- | --- | --- | --- | --- | --- |
|  | K1 | K2 | K3 | K4 | K5 | B1 | B2 | B3 | B4 |
| 1st | O | X | X | O | X* | O* | X | X | O* |
| 2nd | O | X* | X | O* | X* | O* | O* | X* | X* |
| 3rd | O* | X* | O* | O* | X* | O* | X | X* | X* |
| 4th | O* | O* | O* | O* | O | X | X | X | X |
| 5th | X | O | O | X | O | X | X | O | X |
| Rev | X | X | O | O | X* | O* | X | X | O* |
| 2.5th | O | X | X | X* | O | X | O* | O* | X |
| 3.5th | O | X | O | X | O | X | X | O | X |

*These engaged and released conditions do not necessarily need to be as shown on Table 3, but the pertinent gear is permitted to set according to the combination of a plurality of other engaged and released conditions, which are shown on Table 9.

As is apparent from Table 3, it is possible to set five forward speeds and one reverse even in accordance with the embodiment shown in FIG. 3. Further, since the fourth brake means B4 is engaged together with the first brake means B1 as shown on Table 3, it is possible to make the load torque exerted on the clutch means K5 naught by releasing the fifth clutch means K5 in this case. As a result, the fifth clutch means K5 is made to reduce in size to have the small capacity.

Figure 4:
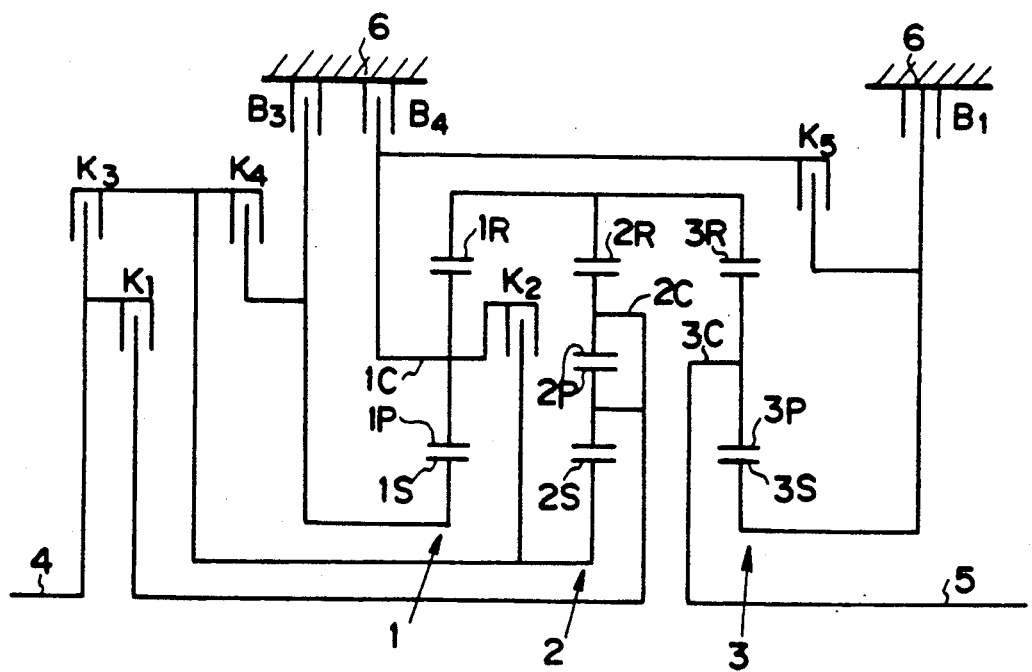

As is apparent from the respective tables, in the embodiments shown in FIGS. 1 through 3, the second brake means B2 may be engaged in the second gear, while the second clutch means K2 may be engaged, instead of the second brake means B2, to set the second gear. Therefore, even if the second brake means B2 is removed, the second gear is possible to set. The embodiment shown in FIG. 4 is similar to that shown in FIG. 3, except that the second brake means B2 is removed under such the above notion. Table 4 shows the operation of this embodiment shown in FIG. 4.

TABLE 4

|  | clutch means | | | | | brake means | | |
| --- | --- | --- | --- | --- | --- | --- | --- | --- |
|  | K1 | K2 | K3 | K4 | K5 | B1 | B3 | B4 |
| 1st | O | X | X | O | O* | O* | X | O* |
| 2nd | O | X* | X | O* | X* | O* | O* | X* |
| 3rd | O* | X* | O* | O* | X* | O* | X* | X* |
| 4th | O* | O* | O* | O* | O* | X | X | X |
| 5th | X | O | O | X | O | X | O | X |
| Rev | X | X | O | O | X* | O* | X | O* |
| 2.5th | O | X | X | O | O | X | O | X |
| 3.5th | O | X | O | X | O | X | O | X |

*These engaged and released conditions do not necessarily need to be as shown on Table 4, but the pertinent gear is possible to set according to the combination of a plurality of other engaged and released conditions, which are shown on Table 9.

Further, according to the present invention, in order to indirectly connect the carrier 1C of the first planetary gear set 1 to the input shaft 4, another clutch means is possible to be provided between the carrier 1C and the carrier 2C of the second planetary gear set 2, instead of the case where the second clutch means K2 is provided between the carrier 1C and the sun gear 2S of the second planetary gear set, and this embodiment is shown as follows.

Figure 5:
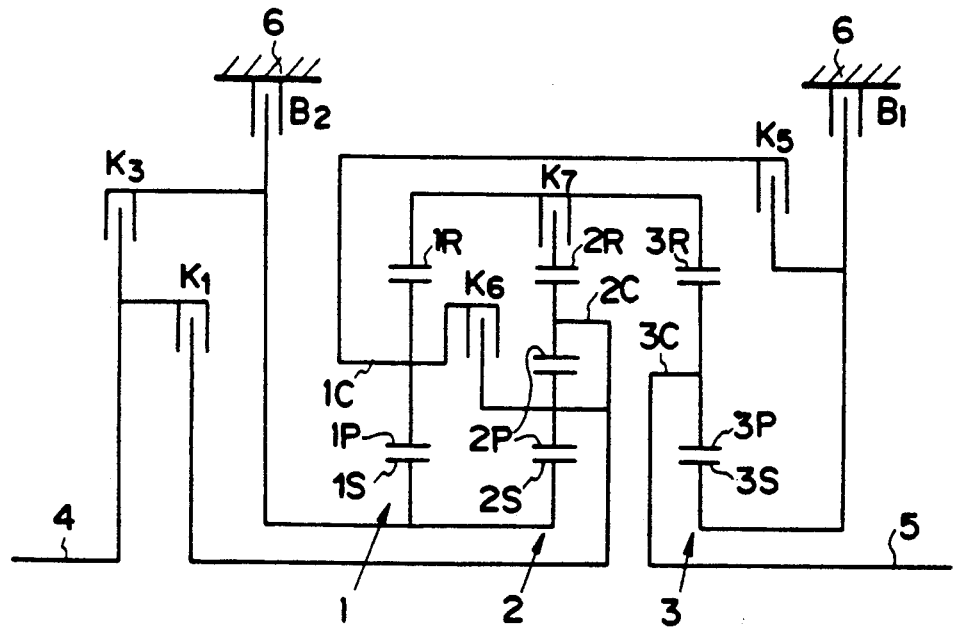

The embodiment shown in FIG. 5 is similar to that shown in FIG. 3, except that the second clutch means K2 is removed, sixth clutch means K6 is instead disposed between the carrier 1C of the first planetary gear set 1 and the carrier 2C of the second planetary gear set 2, seventh clutch means K7 is provided to selectively connect the ring gear 2R of the second planetary gear set 2 to the other ring gear 1R or 3R, and further the third brake means B3 is removed. In the above embodiment, it is possible to set five forward speeds and one reverse or six forward speeds, in which 2.5th gear is added to the five forward speeds, and one reverse. Table 5 shows the operation of this embodiment in FIG. 5.

TABLE 5

|  | clutch means | | | | | brake means | |
| --- | --- | --- | --- | --- | --- | --- | --- |
|  | K1 | K3 | K5 | K6 | K7 | B1 | B2 |
| 1st | O | X | O | X | O | O | X |
| 2nd | O | X | X | X | O | O | O |
| 3rd | O | O* | X | X* | O | O | X |
| 4th | O*¹ | O*¹ | O | O*¹ | O*¹ | X | X |
| 5th | O | X | O | O | X | X | O |
| Rev | O*² | O | O | X*² | X*² | O | X |
| 2.5th | O | X | O | X | O | X | O |

*Either one may be engaged.
*¹While at least three clutch means may be engaged, K7 is engaged and K6 is released when gear change is made between the third gear and the fourth gear, and K6 is engaged and K7 is released when the gear change is made between the fourth gear and the fifth gear. However, K3 is released and K7 is engaged when the K6 is engaged in the third gear.
*²Only either one may be engaged.

Figure 6:
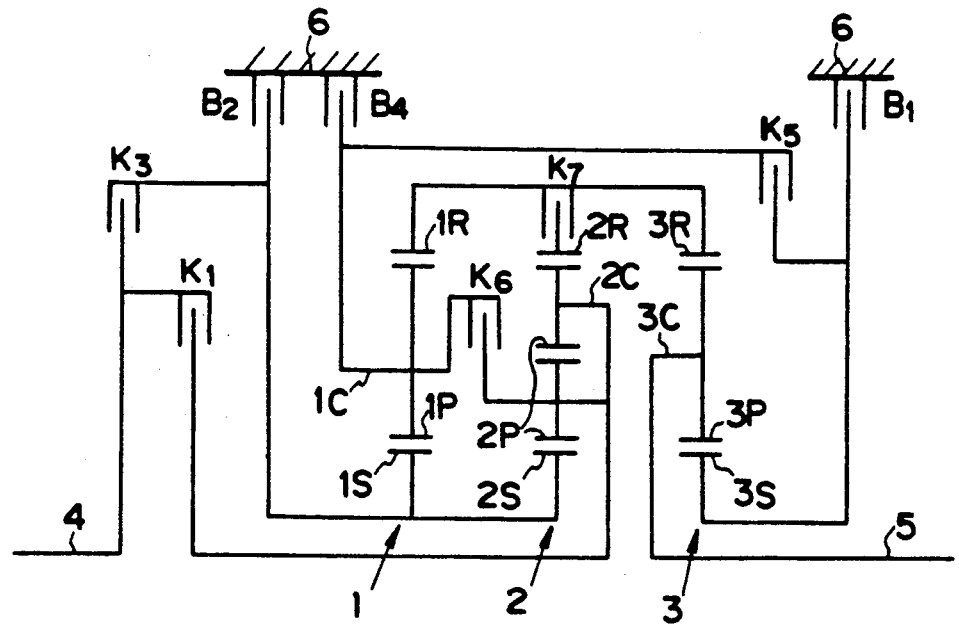

The embodiment shown in FIG. 6 is similar to that shown in FIG. 5, except that the fourth brake means B4 is additionally provided. Table 6 shows the operation of this embodiment in FIG. 6

TABLE 6

|  | clutch means | | | | | brake means | | |
| --- | --- | --- | --- | --- | --- | --- | --- | --- |
|  | K1 | K3 | K5 | K6 | K7 | B1 | B2 | B4 |
| 1st | O | X | X* | X | O | O* | X | O* |
| 2nd | O | X | X | X | O | O | O | X |
| 3rd | O | O*¹ | X | X*¹ | O | O | X | X |
| 4th | O*² | O*² | O | O*² | O*² | X | X | X |
| 5th | O | X | O | O | X | X | O | X |
| Rev | O*³ | O | X*⁴ | X | X*³ | O*⁴ | X | O*⁴ |

TABLE 6-continued

| | clutch means | | | | brake means | | |
|---|---|---|---|---|---|---|---|
| | K1 | K3 | K5 | K6 | K7 | B1 | B2 | B4 |
| 2.5th | ○ | X | ○ | X | ○ | X | ○ | X |

*At least either two may be engaged.
*¹Either one may be engaged.
*²While at least three clutch means may be engaged, K7 is engaged and K6 is released when gear change is made between the third gear and the fourth gear, and K6 is engaged and K7 is released when the gear change is made between the fourth gear and the fifth gear. However, K3 is released and K7 is engaged when K6 is engaged in the third gear.
*³One is engaged, and the other is released.
*⁴At least either two are engaged.

Figure 7:
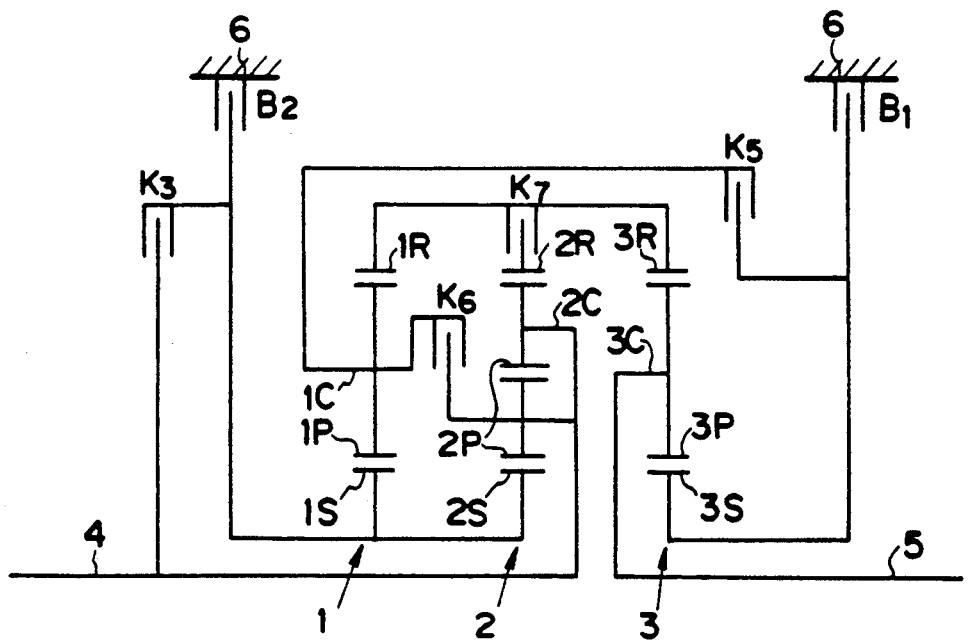

As is apparent from the respective tables, in the embodiments shown in FIGS. 5 and 6, the first clutch means K1 is possible to be engaged in all gears. Therefore, even if the first clutch means K1 is removed from the embodiments shown in FIGS. 5 and 6, it is possible to set five forward speeds and one reverse or six forward speeds, in which 2.5th gear is added to the five forward speeds, and one reverse. That is, the embodiment shown in FIG. 7 is similar to that shown in FIG. 5, except that the first clutch means K1 is removed. Table 7 shows t operation of the embodiment in FIG. 7.

TABLE 7

| | clutch means | | | | brake means | |
|---|---|---|---|---|---|---|
| | K3 | K5 | K6 | K7 | B1 | B2 |
| 1st | X | ○ | X | ○ | ○ | X |
| 2nd | X | X | X | ○ | ○ | ○ |
| 3rd | ○* | X | X* | ○* | ○ | X |
| 4th | ○* | ○ | ○* | ○* | X | X |
| 5th | X | ○ | ○ | X | X | ○ |
| Rev | ○ | ○ | X | X | ○ | X |
| 2.5th | X | ○ | X | ○ | X | ○ |

*Either at least two or more may be engaged.

Figure 8:
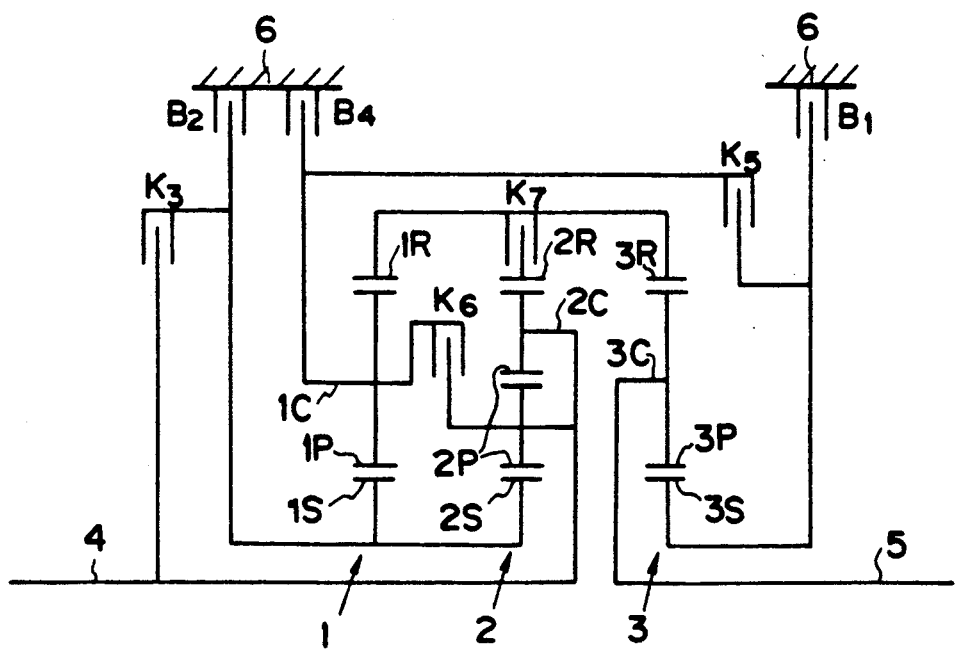

The embodiment shown in FIG. 8 is similar to that shown in FIG. 6, except that the first clutch means K1 is removed. Table 8 shows the operation of the embodiment in FIG. 8.

TABLE 8

| | clutch means | | | | brake means | | |
|---|---|---|---|---|---|---|---|
| | K3 | K5 | K6 | K7 | B1 | B2 | B4 |
| 1st | X | X* | X | ○ | ○* | X | ○* |
| 2nd | X | X | X | ○ | ○ | ○ | X |
| 3rd | ○* | X | X* | ○* | ○ | X | X |
| 4th | ○*¹ | ○ | ○*¹ | ○*¹ | X | X | ○ |
| 5th | X | ○ | ○ | X | X | ○ | X |
| Rev | ○ | X* | X | X | ○* | X | ○* |
| 2.5th | X | ○ | X | ○ | X | ○ | X |

*At least either two may be engaged.
*¹At least two clutch means may be engaged.

Figure 9:
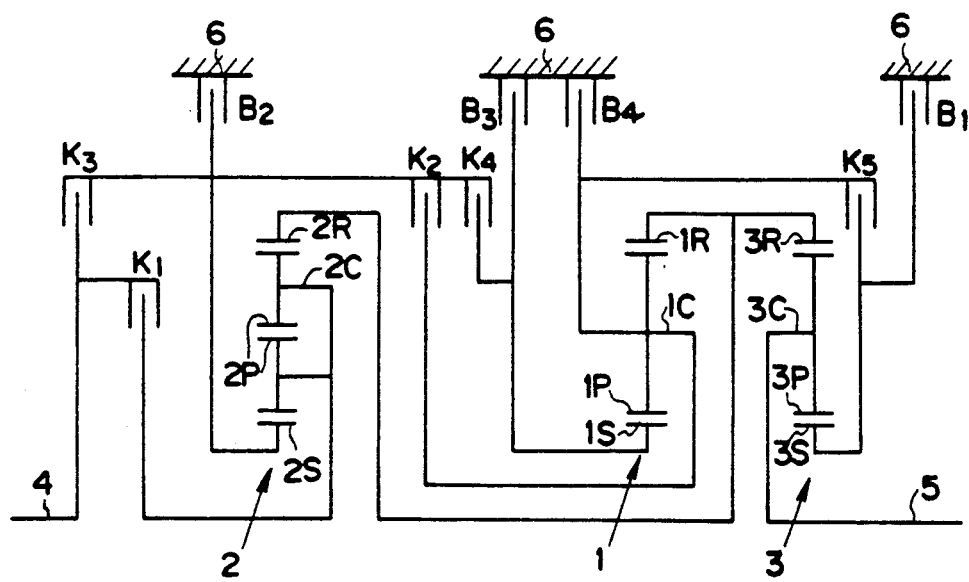

In the respective embodiments as noted above, while the respective planetary gear sets 1, 2 and 3 are arranged in the mentioned order from the side of the input shaft 4, the arrangement of these planetary gear sets may be varied properly, as shown in FIG. 9. The embodiment shown in FIG. 9 is similar to that shown in FIG. 3, except that the respective planetary gear sets 1, 2 and 3 are arranged in the order of the second, first and third planetary gear sets 2, 1 and 3 from the side of the input shaft 4, and the accompanying arrangement of the respective clutch means K1 through K5 and brake means B1 through B4 is varied. The connecting relationship among the respective members is similar to that shown in FIG. 3. According to the embodiment shown in FIG. 9, there is no possibility that the shaft passing through the center comes to be more than three, so that the second clutch means K2 may be disposed outside the connecting member such as a connecting drum to eliminate the restriction of the outer diameter of the second clutch means K2. Even in the embodiment shown in FIG. 9, it is possible to set the five forward or seven forward speeds and one reverse. There are a plurality of patterns of the combination of engagement and releasing of the respective engaging means for setting the respective speeds. Table 9 shows these combination patterns together. In table 9, the mark ○ represents the engaged condition, a blank represents the released condition, and mark * represents that the pertinent engaging means may be engaged.

TABLE 9

| | K1 | K2 | K3 | K4 | K5 | B1 | B2 | B3 | B4 |
|---|---|---|---|---|---|---|---|---|---|
| 1st | ○ | | | ○ | ○ | ○ | * | | * |
| | ○ | | | ○ | ○ | * | ○ | | ○ |
| | ○ | | | ○ | * | ○ | * | | ○ |
| 2nd | ○ | ○ | | | ○ | ○ | * | | * |
| | ○ | ○ | | | ○ | ○ | * | ○ | ○ |
| | ○ | ○ | | | ○ | * | ○ | * | ○ |
| | ○ | * | | | ○ | * | ○ | ○ | ○ |
| | ○ | * | | | * | ○ | ○ | ○ | ○ |
| 2.5th | ○ | | | ○ | ○ | ○ | * | ○ | |
| | ○ | | | ○ | ○ | * | ○ | * | |
| | ○ | | | ○ | * | ○ | ○ | | |
| 3rd | ○ | * | ○ | * | | ○ | | ○ | |
| | * | ○ | ○ | ○ | | ○ | | | |
| | ○ | | ○ | ○ | | ○ | | | ○ |
| | ○ | | ○ | ○ | | * | | | * |
| | ○ | | ○ | ○ | | ○ | | | ○ |
| 3.5th | ○ | ○ | ○ | * | ○ | | | ○ | |
| 4th | ○ | ○ | ○ | | ○ | | | | * |
| | ○ | * | ○ | ○ | ○ | | | | |
| | * | ○ | ○ | ○ | ○ | | | | |
| 5th | ○ | | | | | | | ○ | |
| Rev | | | ○ | ○ | | ○ | * | | * |
| | | | ○ | ○ | | * | ○ | | ○ |
| | | | ○ | ○ | | ○ | * | | ○ |

As is apparent from table 9, the first and second brake means B1, B2 and the fourth brake means B4 may be released in either gear depending on a way of combining the engagement and releasing of other clutch means and brake means. Therefore, at least either one or two out of these brake means B1, B2 and B4 may be removed. Various modifications of the present invention are easily supposed from Table 9.

Now, in the respective embodiments as noted above, each of the clutch means K1 through K7 and each of the brake means B1 through B4 are represented by the symbol of a multi-disc clutch or a multi-disc brake. However, according to the present invention, engaging means having one-way property is possible to be used for the clutch means and the brake means in order to facilitate the control for gear change or to damp the shocks. The engaging means having one-way property described herein includes a well-known one-way clutch provided with rollers such as sprags or a band brake varying the torque capacity depending on the direction of applying a load. The one-way engaging means of this type is simply used or it is used together with the multi-disc clutch or the multi-disc brake to thereby reduce the number of engaging means to be controlled the change-over of the engaged and released conditions when gear change is made, or to automatically change over the engaged and released conditions with a change of load torque, so that the shocks are reduced. To generate such the operation, the members connected to each other through the one-way engaging means are necessary to rotate in the same direction (including the stationary condition) immediately before the gear change is made, and to rotate relative to each other after the gear change is made while the members for performing the connecting operation are necessary to be associated with the transmission of torque before the gear change is made. Further, the one-way engaging means may be interposed between two members connected to each other through the other member performing the same rotation before the gear change is made, in addition to a portion between two member directly connected to each other through the one-way engaging means. A position, in which the one-way engaging means is provided, differs between the case where there is provided clutch means (fifth clutch means K5) for selectively connecting the carrier 1C of the first planetary gear set 1 and the sun gear 3S of the third planetary gear set 3, and the case where there is not provided the clutch means, and also differs between the respective gear change patterns other than the gear to the adjacent gear and including a so-called skipping gear change. Hereinafter will be illustratively explained the position, in which the one-way engaging means is provided, with reference to the case where there is provided the fifth clutch means K5 as shown in FIGS. 2 through 9.

Referring to the gear change between the first gear and the second gear, the one-way engaging means such as the one-way clutch is permitted to be interposed at least in one position either between the sun gear 2S of the second planetary gear set 2 and the sun gear 1S of the first planetary gear set 1, between the carrier 1C of the first planetary gear set 1 and the sun gear 3S of the third planetary gear set 3 or between the carrier 1C and the casing 6. Referring to the gear change between the first gear and the 2.5th gear, the one-way engaging means is permitted to be provided at least in one position either between the carrier 1C of the first planetary gear set 1 and the casing 6 or between the sun gear 3S of the third planetary gear set 3 and the casing 6. Referring to the gear change between the first gear and the third gear, the one-way engaging means is permitted to be provided at least in one position either between the sun gear 2S of the second planetary gear set 2 and the sun gear 1S of the first planetary gear set 1, between the carrier 1C of the first planetary gear set 1 and the sun gear 3S of the third planetary gear set 3 or between the carrier 1C and the casing 6. Referring to the gear change between the first gear and the 3.5th gear, the one-way engaging means is permitted to be interposed at least in one position either between the sun gear 2S of the second planetary gear set 2 and the sun gear 1S of the first planetary gear set 1, between the carrier 1C of the first planetary gear set 1 and the casing 6 or between the sun gear 3S of the third planetary gear set 3 and the casing 6. Further, in this case, there is the gear change pattern needing the performance of the gear change by simultaneously changing over at least three engaging means. Referring to the gear change between the first gear and the fourth gear, the one-way engaging means is permitted to be interposed at least in one position either between the carrier 1C of the first planetary gear set 1 and the casing 6 or between the sun gear 3S of the third planetary gear set 3 and the casing 6. Referring to the gear change between the first gear and the fifth gear, the one-way engaging means is permitted to be interposed at least in one position either between the sun gear 2S of the second planetary gear set 2 and the sun gear 1S of the first planetary gear set 1, between the carrier 1C of the first planetary gear set 1 and the case 6, between the sun gear 3S of the third planetary gear set 3 and the casing 6 or between the carrier 2C of the second planetary gear set 2 and the input shaft 4. Further, in this case, there is also the gear change pattern needing the gear change effected by simultaneously changing over at least three engaging means.

Referring to the gear change between the second gear and the 2.5th gear, the one-way engaging means is permitted to be interposed at least in one position either between the sun gear 2S of the second planetary gear set 2 and the sun gear 3S of the third planetary gear set 3 or between the sun gear 3S of the third planetary gear set 3 and the casing 6. Referring to the gear change between the second gear and the third gear, the one-way engaging means is permitted to be interposed at least in one position either between the sun gear 2S of the second planetary gear set 2 and the sun gear 3S of the third planetary gear set 3 or between the sun gear 2S of the second planetary gear set 2 and the casing 6. Referring to the gear change between the second gear and the 3.5th gear, the one-way engaging means is permitted to be interposed at least in one position either between the sun gear 2S of the second planetary gear set 2 and the sun gear 3S of the third planetary gear set 3, between the sun gear 2S of the second planetary gear set 2 and the casing 6 or between the sun gear 3S of the third planetary gear set 3 and the casing 6. In this case, there is the gear change pattern needing the gear change performed by changing over simultaneously at least three engaging means. Referring to the gear change between the second gear and the fourth gear, the one-way engaging means is permitted to be interposed at least in one position either between the sun gear 2S of the second planetary gear set 2 and the casing 6 or between the sun gear 3S of the third planetary gear set 3 and the casing 6. Referring to the gear change between the second gear and the fifth gear, the one-way engaging means is permitted to be interposed at least in one position either between the sun gear 2S of the second planetary gear set 2 and the casing 6, between the sun gear 3S of the third planetary gear set 3 and the casing 6 or between the carrier 2C of the second planetary gear set 2 and the input shaft 4. In this case, there is the gear change pattern needing the gear change performed by simultaneously changing over at least three engaging means.

Referring to the gear change between the 2.5th gear and the third gear, the one-way engaging means is permitted to be interposed at least in one position either between the sun gear 2S of the second planetary gear set 2 and the sun gear 1S of the first planetary gear set 1, between the sun gear 2S of the second planetary gear set 2 and the casing 6 or between the sun gear 1S of the first planetary gear set 1 and the casing 6. In this case, there is the gear change pattern needing the gear change performed by simultaneously changing over at least three engaging means. Referring to the gear change between the 2.5th gear and the 3.5th gear, the one-way engaging means is permitted to be interposed at least in one position either between the sun gear 2S of the second planetary gear set 2 and the sun gear 1S of the first planetary gear set 1 or the casing 6. Referring to the gear change between the 2.5th gear and the fourth gear, the one-way engaging means is permitted to be interposed at least in one position either between the sun gear 2S of the second planetary gear set 2 and the casing 6, between the sun gear 1S of the first planetary gear set 1 and the casing 6. Referring to the gear change between the 2.5th gear and the fifth gear, the one-way engaging means is permitted to be interposed at least in one position either between the sun gear 2S of the second planetary gear set 2 and the sun gear 1S of the first planetary gear set 1 or the casing 6 or between the carrier 2C of the second planetary gear set 2 and the input shaft 4. In this case, there is the gear change pattern needing the gear change performed by simultaneously changing over at least three engaging means.

Referring to the gear change between the third gear and the 3.5th gear and the gear change between the third gear and the fourth gear respectively, the one-way engaging means is permitted to be interposed between the sun gear 3S of the third planetary gear set 3 and the casing 6. Referring to the gear change between the third gear and the fifth gear, the one-way engaging means is permitted to be interposed at least in one position either between the sun gear 3S of the third planetary gear set 3 and the casing 6, between the sun gear 2S of the second planetary gear set 2 and the ring gear 2R or the carrier 2C of the second planetary gear set 2 or the ring gear 3R of the third planetary gear set 3, or between the input shaft 4 and the ring gear 2R or the carrier 2C of the second planetary gear set 2 or the ring gear 3R of the third planetary gear set 3. In this case, there is also the gear change pattern needing the gear change performed by simultaneously changing over at least three engaging means.

Referring to the gear change between the 3.5th gear and the fourth gear, the one-way engaging means is permitted to be interposed between the sun gear 1S of the first planetary gear set 1 and the casing 6. Referring to the gear change between the 3.5th gear and the fifth gear, the one-way engaging means is permitted to be interposed at least in one position either between the sun gear 2S and the ring gear 2R or the carrier 2C of the second planetary gear set 2 or the ring gear 1R of the first planetary gear set 1 or the ring gear 3R of the third planetary gear set 3, or between the input shaft 4 and the ring gear 2R or the carrier 2C of the second planetary gear set 2 or the ring gear 1R of the first planetary gear set 1 or the ring gear 3R of the third planetary gear set 3.

Referring to the gear change between the fourth gear and the fifth gear, since the whole gear train rotates as a single unit in the fourth gear, the one-way engaging means is provided for each of three components of the respective planetary gear sets 1, 2, 3. That is, the one-way engaging means is permitted to be interposed between the sun gear 2S of the second planetary gear set 2 and either one of the ring gear 2R and carrier 2C of the second planetary gear set 2, or the sun gear 1S and ring gear 1R of the first planetary gear set 1 or the carrier 3C and ring gear 3R of the third planetary gear set 3. Referring to the ring gear 2R of the second planetary gear set 2, the one-way engaging means is permitted to be interposed between the ring gear 2R and any other member (including the input shaft 4) except the casing 6, the ring gear 1R of the first planetary gear set 1, and the ring gear 3R of the third planetary gear set 3. Referring to the carrier 2C of the second planetary gear set 2 and the sun gear 1S of the first planetary gear set 1 respectively, the one-way engaging means is permitted to be interposed between the carrier 2C and the sun gear 1S and any other member (including the input shaft 4) except the casing 6. Referring to the carrier 1C of the first planetary gear set 1, the one-way engaging means is permitted to be interposed either between the ring gear 2R and carrier 2C of the second planetary gear set 2, between the sun gear 1S and ring gear 1R of the first planetary gear set 1, or between the carrier 3C and ring gear 3R of the third planetary gear set 3. Referring to the ring gear 1R of the first planetary gear set 1, the one-way engaging means is permitted to be interposed between the ring gear 1R and any other member (including the input shaft 4) except the casing 6 and the ring gear 2R of the second planetary gear set 2 and the ring gear 3R of the third planetary gear set 3. Referring to the sun gear 3S of the third planetary gear set 3, the one-way engaging means is permitted to be interposed either between the ring gear 2R and carrier 2C of the second planetary gear set 2, between the sun gear 1S and ring gear 1R of the first planetary gear set 1, or between the carrier 3C and ring gear 3R of the third planetary gear set 3. Referring to the carrier 3C of the third planetary gear set 3, the one-way engaging means is permitted to be interposed between the carrier 3C and any other member (including the input shaft 4) except the casing 6. Then, referring to the ring gear 3R of the third planetary gear set 3, the one-way engaging means is permitted to be interposed between the ring gear 3R and any other member (including the input shaft 4) except the casing 6 and the ring gear 2R of the second planetary gear set 2 and the ring gear 1R of the first planetary gear set 1.

Further, in the embodiment, in which the carrier 1C of the first planetary gear set 1 is normally connected to the sun gear 3S of the third planetary gear set 3 without providing with the fifth clutch means K5 as shown in FIG. 1, the one-way engaging means cannot be provided therebetween, so that the disposable positions of the one-way engaging means are restricted in comparison with the above-mentioned case, and the disposable positions of the engaging means may be properly selected.

Further, referring to how to use the one-way engaging means, the specifications and drawings attached to the applications of Japanese Patent Application Nos. 63-176270 and 63-221670 (laid open Nos. 2-26350 and 2-72245) which have been already applied by the present applicant are utilized. An improvement of the engaging means will be shown as follows.

Figure 10:
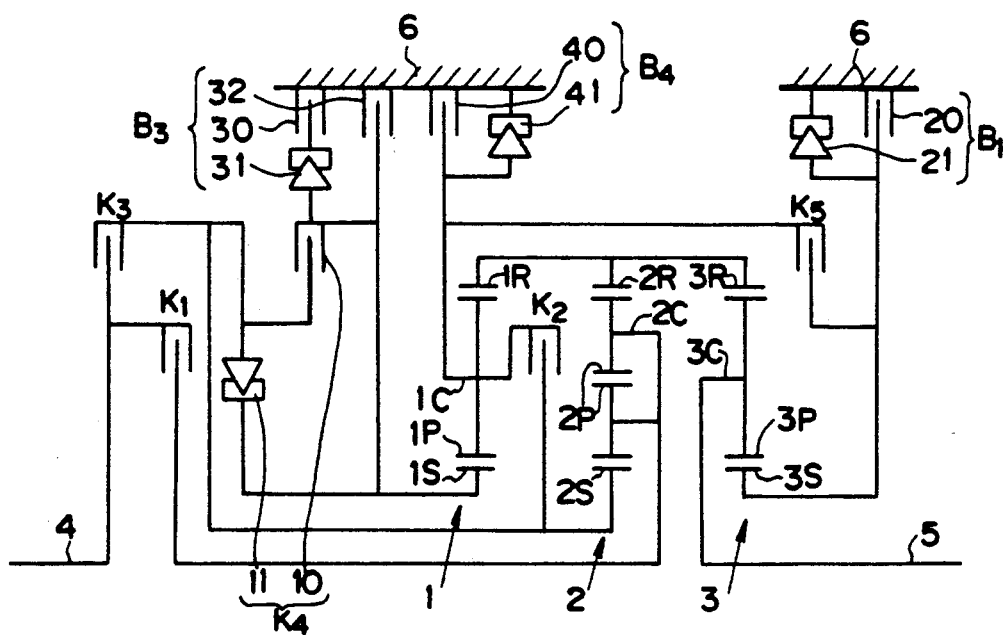

The embodiment shown in FIG. 10 is similar to that shown in FIG. 4, except that the fourth clutch means K4 is constituted of a multi-disc clutch 10 and a one-way clutch 11 which are disposed in parallel relationship to each other, the first brake means B1 is constituted of a multi-disc brake 20 and a one-way clutch 21 which are disposed in parallel relationship to each other, the third brake means B3 is constituted of a multi-disc brake 30 and a one-way clutch 31 which are disposed in series relationship to each other, and a multi-disc brake 32 disposed in parallel relationship to these multi-disc brake 30 and one-way clutch 31, and the fourth brake means B4 is constituted of a multi-disc brake 40 and a one-way clutch 41 which are disposed in parallel relationship to each other. Table 10 shows the operation of the automatic transmission in accordance with the embodiment shown in FIG. 10. On the table, the mark ○ represents the engaged condition, and the mark x represents the released condition, similarly to the aforementioned tables. In addition, in the following table, the mark ⊙ represents the engaged condition in engine braking. Further, a, b, c ... in the columns showing the gear represent the combination of other engaged and released conditions to set the corresponding gear. In the performance of the gear change, the combination of the engaged and released conditions may be changed in the order of the symbols or any combination of the engaged and released conditions may be selected.

TABLE 10

| | clutch means | | | | | | brake means | | | | | |
|---|---|---|---|---|---|---|---|---|---|---|---|---|
| | | | K4 | | | B1 | | B3 | | | B4 | |
| | K1 | K2 | K3 | 10 | 11 | K5 | 20 | 21 | 32 | 30 | 31 | 40 | 41 |
| 1st | ○ | X | X | ⊙ | ○ | X | ⊙ | ○ | X | X | X | X | ○ |
| 2nd | ○ | X | X | ⊙ | ○ | X | ⊙ | ○ | ⊙ | ○ | ○ | X | X |
| 3rd | ○ | X | ○ | ○ | X | X | ⊙ | ○ | X | ○ | X | X | X |
| 4th | | | | | | | | | | | | | |
| a | ○ | X | ○ | ○ | X | ○ | X | X | X | ○ | X | X | X |
| b | ○ | ○ | ○ | ○ | X | ○ | X | X | X | ○ | X | X | X |
| c | X | ○ | ○ | ⊙ | ○ | ○ | X | X | X | ○ | X | X | X |
| 5th | X | ○ | ○ | X | X | ○ | X | X | ○ | X | X | X | X |
| Rev | X | X | ○ | ○ | X | X | ○ | X | X | X | X | ○ | X |
| 2.5th | ○ | X | X | ⊙ | ○ | ○ | X | X | ⊙ | ○ | ○ | X | X |
| 3.5th | ○ | X | ○ | X | X | ○ | X | X | ⊙ | ○ | ○ | X | X |

Figure 11:
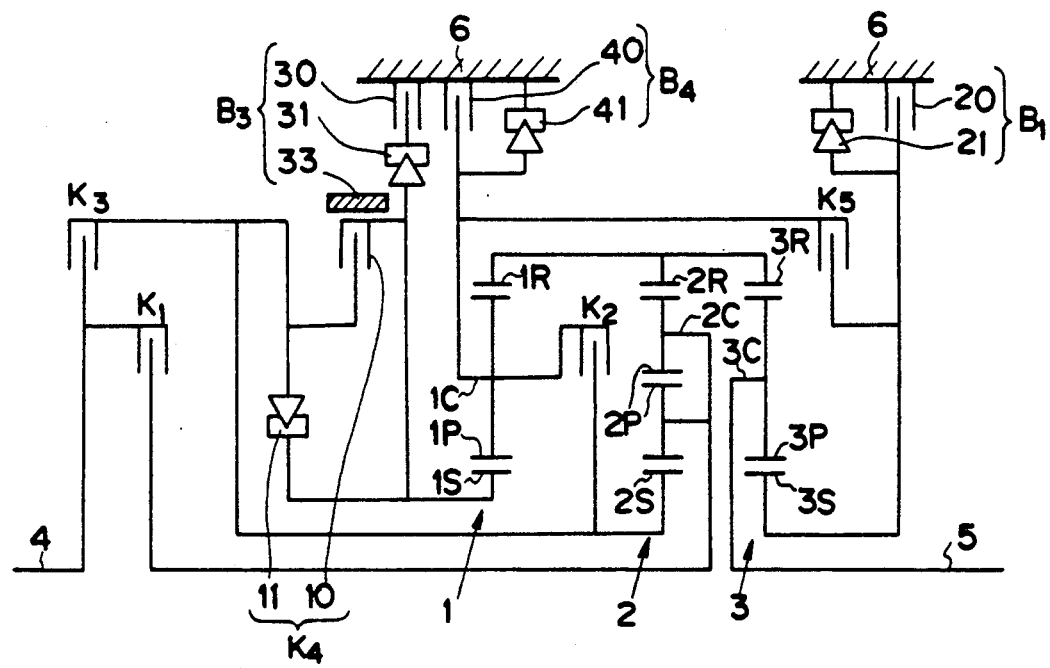

The embodiment shown in FIG. 11 is similar to that shown in FIG. 10, except that one multi-disc brake 32 in the third brake means B3 is replaced with a band brake 33. The operation table of this embodiment in FIG. 11 is similar to Table 10, except that reference numeral 32 in the column B3 is replaced with reference numeral 33.

Figure 12:
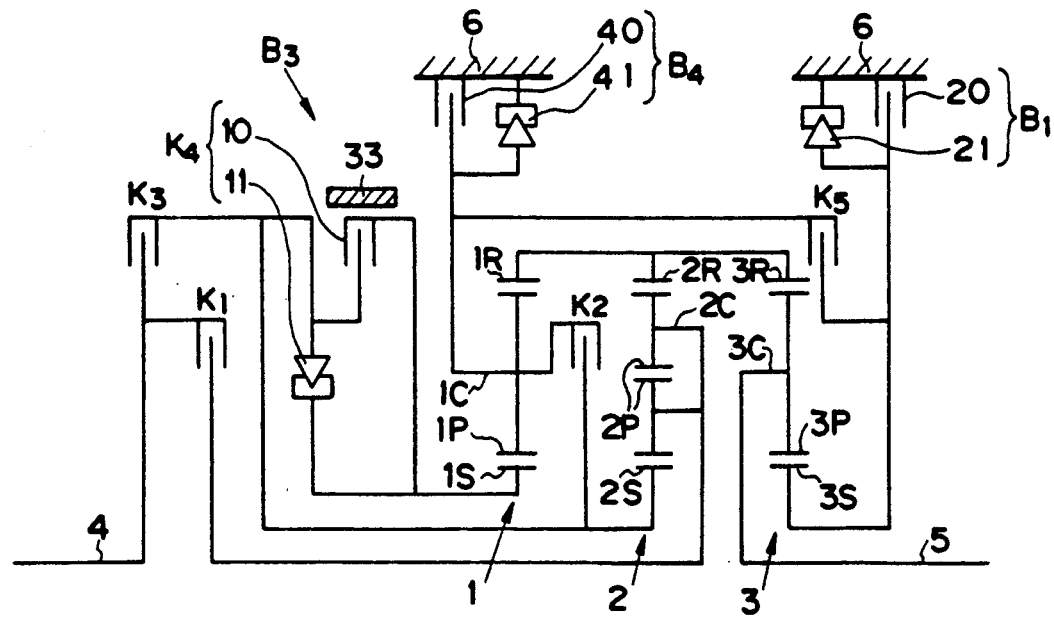

The embodiment shown in FIG. 12 is similar to that shown in FIG. 11, except that the third brake means B3 is constituted only of the band brake 33. Table 11 shows the operation of this embodiment in FIG. 12.

TABLE 11

| | clutch means | | | | | | brake means | | | | |
|---|---|---|---|---|---|---|---|---|---|---|---|
| | | | | K4 | | | B1 | | | B4 | |
| | K1 | K2 | K3 | 10 | 11 | K5 | 20 | 21 | B3 | 40 | 41 |
| 1st | ○ | X | X | ⊙ | ○ | X | ⊙ | ○ | X | ⊙ | ○ |
| 2nd | ○ | X | X | ⊙ | ○ | X | ⊙ | ○ | ○ | X | X |
| 3rd | | | | | | | | | | | |
| a | ○ | X | ○ | X | X | X | ⊙ | ○ | ○ | X | X |
| b | ○ | X | ○ | ○ | X | X | ⊙ | ○ | X | X | X |
| 4th | | | | | | | | | | | |
| a | ○ | X | ○ | ○ | X | ○ | X | X | X | X | X |
| b | ○ | ○ | ○ | ○ | X | ○ | X | X | X | X | X |
| c | X | ○ | ○ | ⊙ | ○ | ○ | X | X | X | X | X |
| 5th | X | ○ | ○ | X | X | ○ | X | X | ○ | X | X |
| Rev | X | X | ○ | ○ | X | X | ○ | X | X | ○ | X |
| 2.5th | ○ | X | X | ⊙ | ○ | ○ | X | X | ○ | X | X |
| 3.5th | ○ | X | ○ | X | X | ○ | X | X | ○ | X | X |

Figure 13:
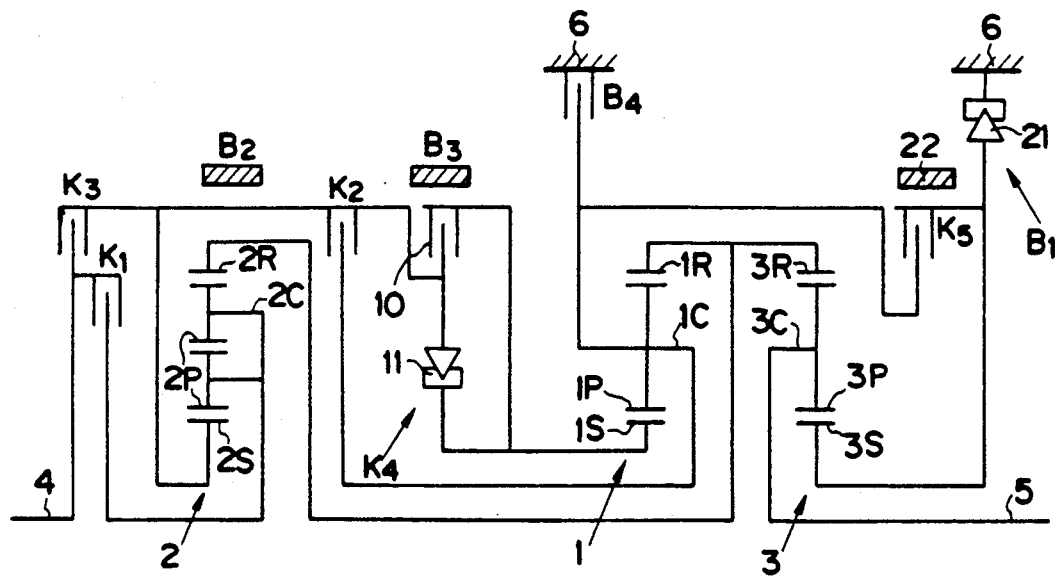

The embodiment shown in FIG. 13 is similar to that shown in FIG. 9, except that one-way engaging means is employed for the engaging means used in the embodiment shown in FIG. 9. That is, the fourth clutch means K4 among the first through fifth clutch means K1 through K5 is constituted of the multi-disc clutch 10 and the one-way clutch 11 which are disposed in parallel relationship to each other. Further, among the brake means, the first brake means B1 is constituted of the one-way clutch 21 and the band brake 22 which are disposed in parallel relationship to each other, the second and third brake means B2, B3 are constituted of a single band brake, respectively, and the fourth brake means B4 is constituted of a single multi-disc brake. The other constitution is similar to that shown in FIG. 9.

Table 12 shows the operation of the automatic transmission in accordance with the embodiment in FIG. 13.

TABLE 12

| | clutch means | | | | | | brake means | | | | |
|---|---|---|---|---|---|---|---|---|---|---|---|
| | | | | K4 | | | B1 | | | | |
| | K1 | K2 | K3 | 10 | 11 | K5 | 22 | 21 | B2 | B3 | B4 |
| 1st | ○ | X | X | ⊙ | ○ | X | ⊙ | ○ | X | X | ○ |
| 2nd | | | | | | | | | | | |
| a | ○ | X | X | X | X | X | ⊙ | ○ | ○ | X | ○ |
| b | ○ | X | X | ○ | X | X | ⊙ | ○ | ○ | ○ | X |
| c | ○ | X | X | ⊙ | ○ | X | ⊙ | ○ | X | ○ | X |
| 3rd | | | | | | | | | | | |
| a | ○ | X | ○ | X | X | X | ⊙ | ○ | X | ○ | X |
| b | ○ | X | ○ | ○ | X | X | ⊙ | ○ | X | X | X |
| 4th | | | | | | | | | | | |
| a | ○ | X | ○ | ○ | X | ○ | X | X | X | X | X |
| b | ○ | ○ | ○ | ○ | X | ○ | X | X | X | X | X |
| c | X | ○ | ○ | ⊙ | ○ | ○ | X | X | X | X | X |
| 5th | X | ○ | ○ | X | X | ○ | X | X | ○ | X | X |
| Rev | X | X | ○ | ○ | X | X | ○ | X | X | X | ○ |
| 2.5th | ○ | X | X | ⊙ | ○ | ○ | X | X | X | ○ | X |
| 3.5th | ○ | X | ○ | X | X | ○ | X | X | X | ○ | X |

Figure 14:
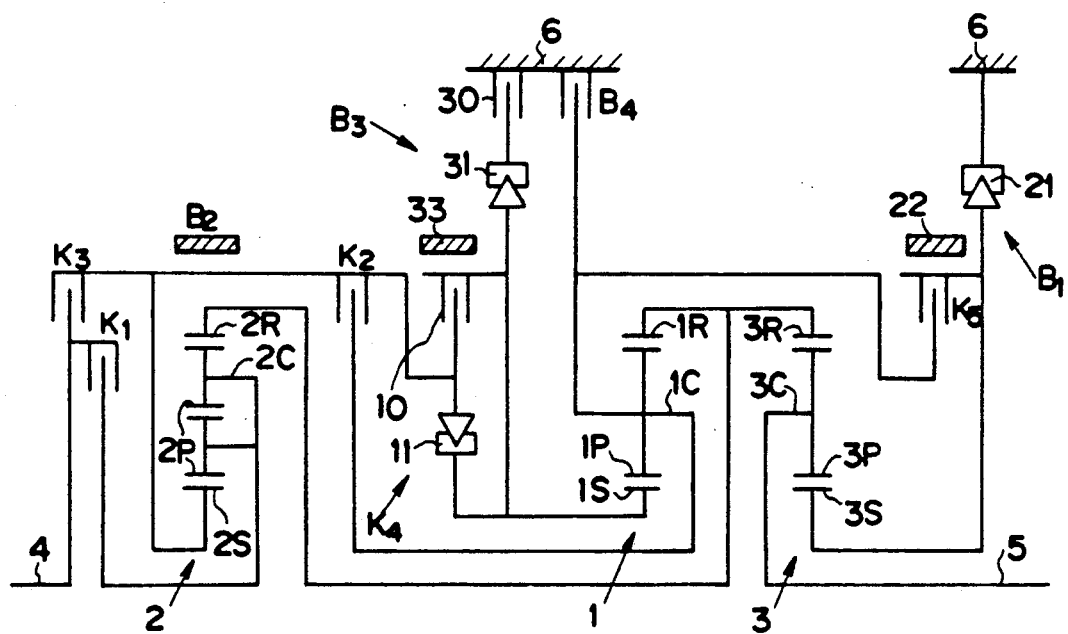

The embodiment shown in FIG. 14 is similar to that shown in FIG. 13, except that the third brake means B3 is constituted of the multi-disk brake 30 and the one-way clutch 31 which are disposed in series relationship to each other, and the band brake 33 disposed in parallel relationship to the combination of the multi-disk brake 30 and one-way clutch 31. Table 13 shows the operation of the embodiment in FIG. 14.

TABLE 13

| | clutch means | | | | | | brake means | | | | | |
|---|---|---|---|---|---|---|---|---|---|---|---|---|
| | | | | K4 | | | B1 | | | B3 | | |
| | K1 | K2 | K3 | 10 | 11 | K5 | 22 | 21 | B2 | 33 | 30 | 31 | B4 |
| 1st | ○ | X | X | ⊙ | ○ | X | ⊙ | ○ | X | X | X | X | ○ |
| 2nd | | | | | | | | | | | | | |
| a | ○ | X | X | X | ○ | X | ⊙ | ○ | ○ | X | X | X | ○ |
| b | ○ | X | X | ○ | X | X | ⊙ | ○ | ○ | ○ | X | X | X |
| c | ○ | X | X | ○ | X | X | ⊙ | ○ | X | ⊙ | ○ | ○ | X |
| 3rd | ○ | X | ○ | ○ | X | X | ⊙ | ○ | X | X | ○ | X | X |
| 4th | | | | | | | | | | | | | |
| a | ○ | X | ○ | ○ | X | ○ | X | X | X | X | ○ | X | X |
| b | ○ | ○ | ○ | ○ | X | ○ | X | X | X | X | ○ | X | X |
| c | X | ○ | ○ | ⊙ | ○ | ○ | X | X | X | X | ○ | X | X |
| 5th | X | ○ | ○ | X | X | ○ | X | X | ○ | X | ○ | X | X |
| Rev | X | X | ○ | ○ | X | X | ○ | X | X | X | X | X | ○ |
| 2.5th | ○ | X | X | ⊙ | ○ | ○ | X | X | ⊙ | ○ | ○ | X |
| 3.5th | ○ | X | ○ | X | X | ○ | X | X | X | ⊙ | ○ | ○ | X |

Figure 15:
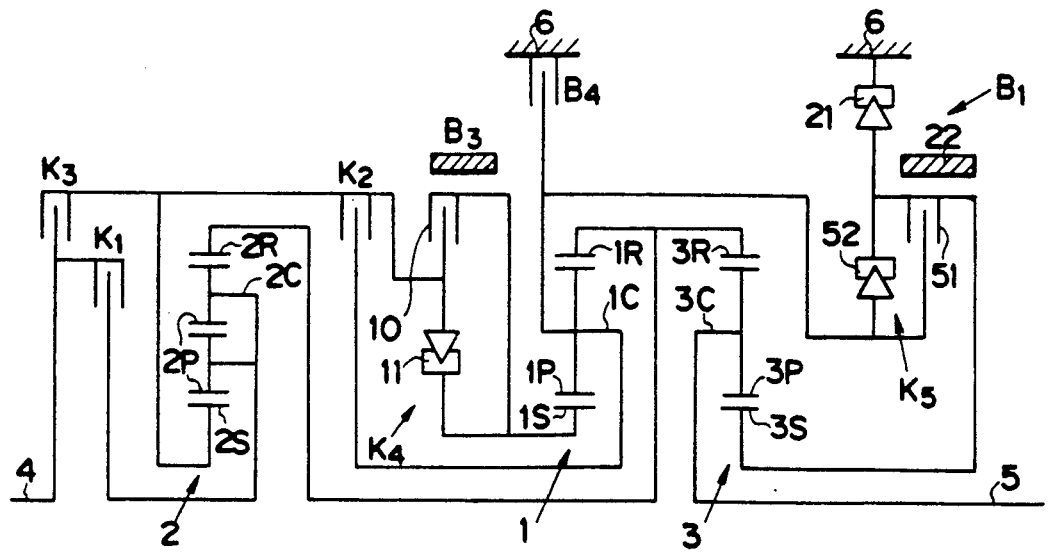

The embodiment shown in FIG. 15 is similar to that shown in FIG. 13, except that the second brake means B2 is removed, while the fifth clutch means K5 is constituted of a multi-disc clutch 51 and a one-way clutch 52 which are disposed in parallel relationship to each other. Table 14 shows the operation of this embodiment in FIG. 15.

TABLE 14

| | clutch means | | | | | | | brake means | | | |
|---|---|---|---|---|---|---|---|---|---|---|---|
| | | | | K4 | | K6 | | B1 | | | |
| | K1 | K2 | K3 | 10 | 11 | 51 | 52 | 22 | 21 | B3 | B4 |
| 1st | | | | | | | | | | | |
| a | ○ | X | X | ⊙ | ○ | ⊙ | ○ | ⊙ | ○ | X | ○ |
| b | ○ | X | X | ⊙ | ○ | ⊙ | ○ | ⊙ | ○ | X | X |
| 2nd | ○ | X | X | ⊙ | ○ | X | X | ⊙ | ○ | ○ | X |
| 3rd | | | | | | | | | | | |
| a | ○ | X | ○ | X | X | X | X | ⊙ | ○ | ○ | X |
| b | ○ | X | ○ | ○ | X | X | X | ⊙ | ○ | X | X |
| 4th | | | | | | | | | | | |
| a | ○ | X | ○ | ○ | X | ○ | X | X | X | X | X |

TABLE 14-continued

| | clutch means | | | K4 | | K6 | | brake means B1 | | | |
|---|---|---|---|---|---|---|---|---|---|---|---|
| | K1 | K2 | K3 | 10 | 11 | 51 | 52 | 22 | 21 | B3 | B4 |
| b | O | O | O | O | X | O | X | X | X | X | X |
| c | X | O | O | ⊙ | O | O | X | X | X | X | X |
| 5th | X | O | O | X | X | O | X | X | X | O | X |
| Rev | X | X | O | O | X | X | X | O | X | X | O |
| 2.5th | O | X | X | ⊙ | O | O | X | X | X | O | X |
| 3.5th | O | X | O | X | X | O | X | X | X | O | X |

Figure 16:
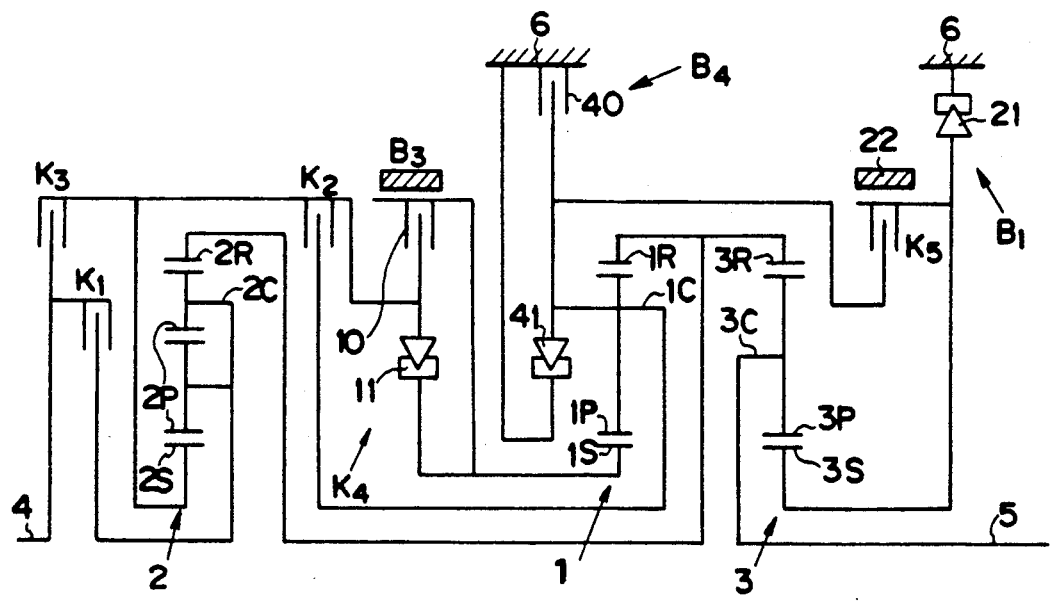

The embodiment shown in FIG. 16 is similar to that shown in FIG. 13, except that the second brake means B2 is removed, the fourth brake means B4 is constituted of a multi-disc brake 40 and a one-way clutch 41 which are disposed in parallel relationship to each other, and the one-way clutch 41 is disposed on the inner peripheral side of the multi-disc brake 40. In other words, the embodiment shown in FIG. 16 is similar to that shown in FIG. 12, except that the disposal of the one-way clutch 41 constituting the fourth brake means B4 is changed, and the multi-disc brake 20 constituting the first brake means B1 is replaced with the band brake 22. Accordingly, the operation table of this embodiment in FIG. 16 is similar to Table 11.

Figure 17:
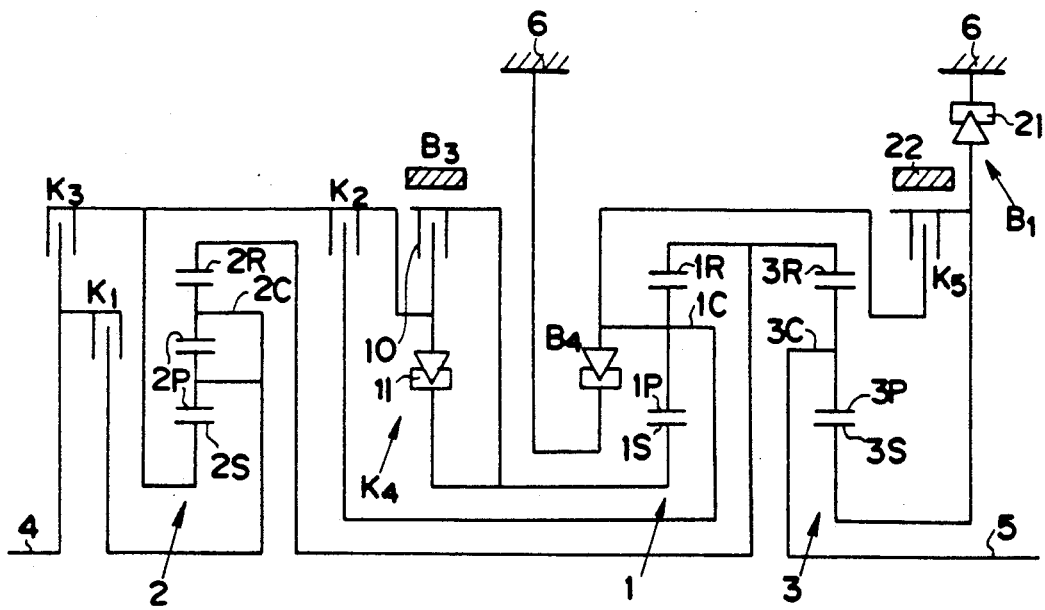

The embodiment shown in FIG. 17 is similar to that shown in FIG. 16, except that the fourth brake means B4 is constituted of a single one-way clutch. Table 15 shows the operation of this embodiment in FIG. 17. Further, in the embodiment shown in FIG. 17, since the band brake 22 of the first brake means B1 and the multi-disc clutch constituting the fifth clutch means K5 are engaged in reverse to hold the carrier 1C of the first planetary gear set 1 stationary, the large load torque is exerted on the fifth clutch means K5. Accordingly, it is preferable to reduce the input torque to the automatic transmission or the engine output in reverse gear so that the fifth clutch means K5 is reduced in capacity and the durability of the fifth clutch means K5 is improved.

TABLE 15

| | clutch means | | | K4 | | | brake means B1 | | | |
|---|---|---|---|---|---|---|---|---|---|---|
| | K1 | K2 | K3 | 10 | 11 | K5 | 22 | 21 | B3 | B4 |
| 1st | O | X | X | ⊙ | O | ⊙ | ⊙ | O | X | O |
| 2nd | O | X | X | ⊙ | O | X | ⊙ | O | O | X |
| 3rd | | | | | | | | | | |
| a | O | X | O | X | X | X | ⊙ | O | O | X |
| b | O | X | O | O | X | X | ⊙ | O | X | X |
| 4th | | | | | | | | | | |
| a | O | X | O | O | X | O | X | X | X | X |
| b | O | O | O | O | X | O | X | X | X | X |
| c | X | O | O | ⊙ | O | O | X | X | X | X |
| 5th | X | O | O | X | X | O | X | X | O | X |
| Rev | X | X | O | O | X | O | O | X | X | X |
| 2.5th | O | X | X | ⊙ | O | O | X | X | O | X |
| 3.5th | O | X | O | X | X | O | X | X | O | X |

Figure 18:
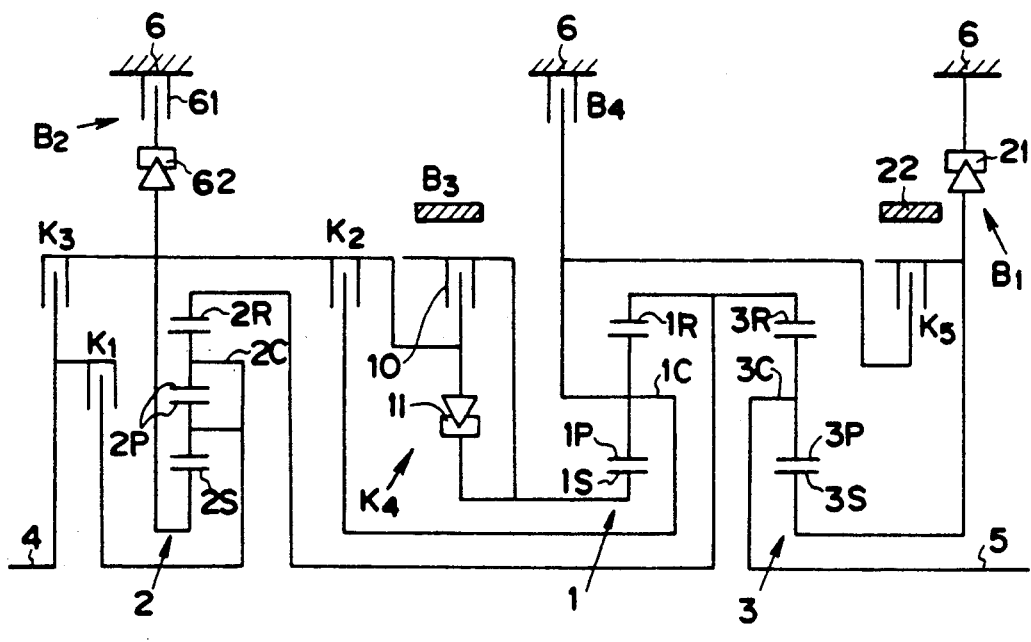

The embodiment shown in FIG. 18 is similar to that shown in FIG. 13, except that the second brake means B2 is constituted of a multi-disc brake 61 and a one-way clutch 62 which are disposed in series relationship to each other. Table 16 shows the operation of this embodiment in FIG. 18.

TABLE 16

| | clutch means | | | K4 | | | brake means B1 | | B2 | | | |
|---|---|---|---|---|---|---|---|---|---|---|---|---|
| | K1 | K2 | K3 | 10 | 11 | K5 | 22 | 21 | 61 | 62 | B3 | B4 |
| 1st | O | X | X | ⊙ | O | X | ⊙ | O | X | X | X | O |
| 2nd | | | | | | | | | | | | |
| a | O | ⊙ | X | X | X | X | ⊙ | O | O | O | X | O |
| b | O | X | X | O | X | X | ⊙ | O | O | O | ⊙ | X |
| 3rd | O | X | O | O | X | X | ⊙ | O | O | X | X | X |
| 4th | | | | | | | | | | | | |
| a | O | X | O | O | X | O | X | X | O | X | X | X |
| b | O | O | O | O | X | O | X | X | O | X | X | X |
| c | X | O | O | ⊙ | O | O | X | X | O | X | X | X |
| 5th | X | O | O | X | X | O | X | X | O | X | O | X |
| Rev | X | X | O | O | X | X | O | X | X | X | X | O |
| 2.5th | O | X | X | ⊙ | O | O | X | X | O | X | O | X |
| 3.5th | O | X | O | X | X | O | X | X | O | X | O | X |

Though the first to eighteenth embodiments of the present invention have been heretofore described, it is a matter of course that the present invention is not limited to these embodiments. The connection of the components themselves in the respective planetary gear set will do either in the normal connection or in the selective connection through engaging means such as a clutch. Further, the members for interconnecting the input and output shafts and those to be held stationary are permitted to the properly determined, if necessary. Also, in the present invention, the one-way engaging means such as one-way clutch may be employed for either the clutch means or brake means or a plurality of clutch means or brake means.

Referring the advantages obtained in accordance with the present invention together, it is possible to set five forward speeds to seven forward speeds by the use of a small number of engaging means according to the present invention. Also, when the five forward speeds are set, the change gear ratios of the respective speeds are approximately relevant to the geometric series and further the respective planetary gear sets are prevented from having the large diameters. As a result, according to the present invention, it is possible to obtain a compact automatic transmission which is excellent in power performance and gear change controllability, and permits the reduction of shocks in gear change.

What is claimed is:

1. An automatic transmission for changing the rotational speed of an input shaft to transmit the resultant rotation to an output shaft through a gear train including a plurality of planetary gear sets, comprising:
   a single pinion type first planetary gear set provided with a first sun gear, a first ring gear, and a first carrier for holding a pinion gear meshing with said first sun gear and said first ring gear;
   a double pinion type second planetary gear set provided with a second sun gear normally or selectively connected to said first sun gear, a second ring gear normally or selectively connected to said first ring gear, and a second carrier for holding an inner pinion gear meshing with said second sun gear and an outer pinion gear meshing with said inner pinion and said second ring gear; and
   a single pinion type third planetary gear set provided with a third sun gear normally or selectively connected to said first carrier, a third ring gear normally or selectively connected to said first and second ring gears, and a third carrier for holding a pinion gear meshing with said third sun gear and said third ring gear.

2. An automatic transmission according to claim 1, further comprising first clutch means for selectively interconnecting the input shaft and the second carrier, second clutch means for selectively interconnecting the first carrier and the second sun gear, third clutch means for selectively interconnecting the input shaft and the second sun gear, fourth clutch means for selectively interconnecting the first and second sun gears, first brake means for selectively stopping the rotation of the third sun gear, and second brake means for selectively stopping the rotation of the first sun gear.

3. An automatic transmission according to claim 2, further comprising fifth clutch means for selectively interconnecting the first carrier and the third sun gear.

4. An automatic transmission according to claim 2, further comprising third brake means for selectively stopping the rotation of the second sun gear.

5. An automatic transmission according to claim 3, further comprising fourth brake means for selectively stopping the rotation of the first carrier.

6. An automatic transmission according to claim 4 further comprising a fifth clutch means for selectively interconnecting the first carrier and the third sun gear.

7. An automatic transmission according to claim 5 further comprising a third brake means for selectively stopping the rotation of the second sun gear.

8. An automatic transmission according to claim 2, wherein said input shaft and said output shaft are disposed on the identical axis, and the first, second and third planetary gear sets are arranged between said input shaft and said output shaft in the mentioned order from the side of said input shaft and on the identical axis.

9. An automatic transmission according to claim 8, wherein the first, third and fourth clutch means are disposed on the input shaft side from said first planetary gear set, and the second clutch means is disposed between said first and second planetary gear sets.

10. An automatic transmission according to claim 2, wherein said input shaft and said output shaft are disposed on an identical axis, and the second, first and third planetary gear sets are arranged between said input shaft and said output shaft from the side of said input shaft.

11. An automatic transmission according to claim 10, wherein the first and third clutch means are disposed on the input shaft side from said second planetary gear set, and the second and fourth clutch means are disposed between said first and second planetary gear sets.

12. An automatic transmission according to claim 2, wherein each of said clutch means has a multi-disc clutch.

13. An automatic transmission according to claim 2, wherein said fourth clutch means has a one-way clutch and a multi-disc clutch disposed in parallel relationship to each other between the first sun gear and the second sun gear.

14. An automatic transmission according to claim 2, wherein each of said brake means has a multi-disc brake.

15. An automatic transmission according to claim 2, further comprising a casing for accommodating said gear train, and said first brake means has a one-way clutch and a multi-disc brake disposed in parallel relationship to each other between the third sun gear and the casing.

16. An automatic transmission according to claim 2, further comprising a casing for accommodating said gear train, and said first brake means has a one-way clutch disposed between the third sun gear and the casing and a band brake disposed in parallel relationship to said one-way clutch.

17. An automatic transmission according to claim 2, wherein said second brake means consists of a band brake.

18. An automatic transmission according to claim 2, further comprising a casing for accommodating said gear train, and said second brake means has a one-way clutch and a multi-disc brake disposed in series relationship to each other between the first sun gear and the casing, and another multi-disc brake disposed in parallel relationship to said one-way clutch and said multi-disc brake.

19. An automatic transmission according to claim 2, further comprising a casing for accommodating said gear train, and said second brake means has a one-way clutch and a multi-disc brake disposed in series relationship to each other between the first sun gear and the casing, and a band brake disposed in parallel relationship to said one-way clutch and said multi-disc brake.

20. An automatic transmission according to claim 4, wherein said third brake means has a multi-disc brake.

21. An automatic transmission according to claim 4, wherein said third brake means has a band brake.

22. An automatic transmission according to claim 4, further comprising a casing for accommodating said gear train, and said third brake means has a one-way clutch and a multi-disc brake disposed in series relationship to each other between the second sun gear and the casing.

23. An automatic transmission according to claim 5, wherein said fourth brake means has a multi-disc brake.

24. An automatic transmission according to claim 5, further comprising a casing for accommodating said gear train, and said fourth brake means has a one-way clutch and a multi-disc brake disposed in parallel relationship to each other between the first carrier and the casing.

25. An automatic transmission according to claim 5, further comprising a casing for accommodating said gear train, and said fourth brake means has a one-way clutch disposed between the first carrier and the casing.

26. An automatic transmission according to claim 2, further comprising a casing for accommodating the gear train,
wherein the fourth clutch means has a one-way clutch and a multi-disc clutch disposed in parallel relationship to each other between the first sun gear and the second sun gear, the first brake means has a one-way clutch and a multi-disc brake disposed in parallel relationship to each other between the third sun gear and the casing and the second brake means consists of a band brake.

27. An automatic transmission according to claim 26, further comprising a third brake means for selectively stopping the rotation of the second sun gear, the third brake means including a one-way clutch and a multi-disc brake disposed in series relationship to each other between the second sun gear and the casing and another multi-disc brake disposed in parallel relationship to the arrangement of the one-way clutch and the multi-disc clutch of the fourth clutch means.

28. An automatic transmission according to claim 26, further comprising a third brake means for selectively stopping the rotation of the second sun gear, the third brake means consisting of a band brake.

29. An automatic transmission according to claim 5 further comprising a casing for accommodating the gear train, wherein the fourth clutch means has a one-way clutch and a multi-disc clutch disposed in parallel relationship to each other between the first sun gear and the second sun gear, the first brake means has a one-way clutch and a multi-disc brake disposed in parallel relationship to each other between the third sun gear and the casing and the second brake means consists of a band brake.

30. An automatic transmission according to claim 5, wherein the fourth clutch means has a one-way clutch and a multi-disc clutch disposed in parallel relationship to each other between the first sun gear and the second sun gear, and each of the first brake means and the second brake means consists of a band brake.

31. An automatic transmission according to claim 29, further comprising a third brake means for selectively stopping the rotation of the second sun gear, which has a one-way clutch and a multi-disc brake disposed in series relationship between the second sun gear and the casing and another multi-disc brake disposed in parallel relationship to the arrangement of the one-way clutch and multi-disc clutch of the fourth clutch means.

32. An automatic transmission according to claim 29 further comprising a third brake means for selectively stopping the rotation of the second sun gear, which consists of a band brake.

33. An automatic transmission according to claim 1, further comprising first clutch means for selectively interconnecting the second carrier and the input shaft, second clutch means for interconnecting the input shaft and the interconnected first and second sun gears, third clutch means for selectively interconnecting the first carrier and the third sun gear, fourth clutch means for selectively interconnecting the first and second carrier, fifth clutch means for selectively interconnecting the second ring gear and the interconnected first and third ring gears, first brake means for selectively stopping the rotation of the third sun gear, and second brake means for selectively stopping the interconnected first and second sun gears, and capable of setting at least five forward speeds and one reverse.

34. A automatic transmission according to claim 33, further comprising third brake means for selectively stopping the rotation of the first carrier.

35. An automatic transmission according to claim 33, wherein said input shaft and said output shaft are disposed on the identical axis, and the first, second and third planetary gear sets are disposed in the mentioned order between said input shaft and said output shaft and on the identical axis.

36. An automatic transmission according to claim 35, wherein the first and second clutch means are disposed on the input shaft side from the first planetary gear set, the fourth clutch means is disposed between the first and second planetary gear sets, and the third clutch means is disposed on the output shaft side from the third planetary gear set.

37. An automatic transmission according to claim 1, further comprising first clutch means for selectively interconnecting the interconnected first and second sun gears and the input shaft, second clutch means for selectively interconnecting the first carrier and the third sun gear, third clutch means for selectively interconnecting the first and second carrier, fourth clutch means for selectively interconnecting the interconnected first and third ring gears and the second ring gear, first brake means for selectively stopping the rotation of the third sun gear, and second brake means for selectively stopping the rotation of the interconnected first and second sun gears, said input shaft being normally connected to the second carrier, while the output shaft being capable of setting at least five forward speeds and one reverse.

38. An automatic transmission according to claim 37, further comprising third brake means for selectively stopping the rotation of the first carrier.

* * * * *

UNITED STATES PATENT AND TRADEMARK OFFICE
CERTIFICATE OF CORRECTION

PATENT NO. : 5,090,952

DATED : February 25, 1992

INVENTOR(S) : ASADA, Toshiyuki

It is certified that error appears in the above-identified patent and that said Letters Patent is hereby corrected as shown below:

Col. 22, line 67, Claim 1, line 21, after "a third carrier" insert
--connected to the output shaft--.

Col. 24, line 5, Claim 17, line 5, change "consists of" to --includes--.

Signed and Sealed this

Twenty-sixth Day of April, 1994

Attest:

BRUCE LEHMAN

Attesting Officer    Commissioner of Patents and Trademarks